US007865279B2

(12) United States Patent
Taki

(10) Patent No.: US 7,865,279 B2
(45) Date of Patent: Jan. 4, 2011

(54) VEHICLE INFORMATION-COMMUNICATION METHOD, VEHICLE INFORMATION-COMMUNICATION SYSTEM, VEHICLE AND CONTROL CENTER

(75) Inventor: Naoki Taki, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 67 days.

(21) Appl. No.: 12/289,731

(22) Filed: Nov. 3, 2008

(65) Prior Publication Data

US 2009/0228170 A1 Sep. 10, 2009

Related U.S. Application Data

(62) Division of application No. 10/892,325, filed on Jul. 16, 2004, now Pat. No. 7,471,999.

(30) Foreign Application Priority Data

Jul. 25, 2003 (JP) ............................ 2003-280376

(51) Int. Cl.
*G06F 19/00* (2006.01)

(52) U.S. Cl. ............................... 701/29; 701/33; 701/2; 340/458

(58) Field of Classification Search ............. 701/29–33, 701/35, 200; 340/505, 425.5, 458–459; 702/188
See application file for complete search history.

(56) References Cited

U.S. PATENT DOCUMENTS 5,157,610 A * 10/1992 Asano et al. .................. 701/32

(Continued)

FOREIGN PATENT DOCUMENTS

DE 199 46 556 4/2001

(Continued)

OTHER PUBLICATIONS

Streaming-Viability Analysis and Packet Scheduling for Video Over In-Vehicle Wireless Networks; Qiong Li et al.; Vehicular Technology, IEEE Transactions on; vol. 56 , Issue: 6 , Part: 1; Digital Object Identifier: 10.1109/TVT.2007.901927 Publication Year: 2007 , pp. 3533-3549.*

(Continued)

*Primary Examiner*—Cuong H Nguyen
(74) *Attorney, Agent, or Firm*—Finnegan, Henderson, Farabow, Garrett & Dunner, LLP

(57) ABSTRACT

A control center transmits failure information transmission request information to a vehicle. The vehicle receives the failure information transmission request information transmitted from the control center. A navigation ECU and a gateway ECU obtain failure information from each ECU in cooperation with each other. At this time, the gateway ECU determines whether a data volume of the failure information is larger than a predetermined information volume. When it is determined that the data volume of the failure information is larger than the predetermined information volume, the gateway ECU divides the failure information into plural pieces, and outputs each piece of information. Also, the ECU does not output the failure information, which is output to a network built in the vehicle, to the navigation ECU, while a failure information obtaining device is connected. Meanwhile, the control center does not receive the failure information while the failure information obtaining device is connected.

4 Claims, 15 Drawing Sheets

U.S. PATENT DOCUMENTS

| | | | | | |
|---|---|---|---|---|---|
| 5,758,300 | A * | 5/1998 | Abe | 455/424 |
| 6,025,776 | A * | 2/2000 | Matsuura | 340/438 |
| 6,094,609 | A * | 7/2000 | Arjomand | 701/29 |
| 6,225,898 | B1 * | 5/2001 | Kamiya et al. | 340/505 |
| 6,577,934 | B2 | 6/2003 | Matsunaga et al. | |
| 6,694,235 | B2 * | 2/2004 | Akiyama | 701/33 |
| 7,024,187 | B2 | 4/2006 | Moles et al. | |
| 7,471,999 | B2 * | 12/2008 | Taki | 701/33 |
| 2001/0002450 | A1 | 5/2001 | Mizutani et al. | |
| 2001/0037168 | A1 * | 11/2001 | Hozuka et al. | 701/29 |
| 2002/0059020 | A1 | 5/2002 | Abe et al. | |
| 2002/0116103 | A1 | 8/2002 | Matsunaga et al. | |
| 2003/0117298 | A1 | 6/2003 | Tokunaga et al. | |
| 2004/0073791 | A1 | 4/2004 | Vollmer et al. | |
| 2005/0015380 | A1 | 1/2005 | Burkhardt et al. | |
| 2005/0107927 | A1 | 5/2005 | Mavreas | |
| 2006/0235580 | A1 | 10/2006 | Weiss et al. | |

FOREIGN PATENT DOCUMENTS

| | | | |
|---|---|---|---|
| DE | 101 40 519 | | 3/2003 |
| DE | 102 30 351 | A1 * | 7/2008 |
| JP | 62094443 | A | 4/1987 |
| JP | 11230868 | A * | 8/1999 |
| JP | 11326140 | A | 11/1999 |

OTHER PUBLICATIONS

A new algorithm for double talk detection and separation in the context of digital mobile radio telephone; Ezzaidi, H et al.; Acoustics, Speech, and Signal Processing, 1997. ICASSP-97., 1997 IEEE International Conference on; vol. 3; Digital Object Identifier: 10.1109/ICASSP.1997.598911; Publication Year: 1997 , Page(s).*

Function, equipment, and field testing of a route guidance and information system for drivers (ALI); Braegas, P.; Vehicular Technology, IEEE Transactions on ; vol. 29 , Issue: 2; Publication Year: 1980 , pp. 216-225.*

Analysis of a Secure Software Upload Technique in Advanced Vehicles using Wireless Links; Hossain, I. et al.; Intelligent Transportation Systems Conference, 2007. ITSC 2007. IEEE; Digital Object Identifier: 10.1109/ITSC.2007.4357797 Publication Year: 2007 , pp. 1010-1015.*

Remote Monitoring of Vehicle Diagnostics and Location Using a Smart Box with Global Positioning System and General Packet Radio Service; Al-Taee, M.A. et al.; Computer Systems and Applications, 2007. AICCSA '07. IEEE/ACS International Conference on; Digital Object Identifier: 10.1109/AICCSA.2007.370910; Publication Year: 2007 , pp. 385-388.*

Remote vehicle state of health monitoring and its application to vehicle no-start prediction; Yilu Zhang; Salman, M.; Subramania, H.S.; Edwards, R.; Correia, J.; Gantt, G.W.; Rychlinksi, M.; Stanford, J.; AUTOTESTCON, 2009 IEEE; Digital Object Identifier: 10.1109/AUTEST.2009.5314011; Publication Year: 2009 , pp. 88-93.*

The Design of Remote Vehicle Management System Based on OMA DM Protocol and AUTOSAR S/W Architecture; Hyun-Ki Ryu et al.; Advanced Language Processing and Web Information Technology, 2008. ALPIT '08. International Conference on; Digital Object Identifier: 10.1109/ALPIT.2008.18; Publication Year: 2008 , Publication Year: 2008 , pp. 393-397.*

Design of an OSEK/VDX and OSGi-based embedded software platform for vehicular applications; Yuan Sun et al.; Vehicular Electronics and Safety, 2007. ICVES. IEEE International Conference on; Digital Object Identifier: 10.1109/ICVES.2007.4456366 Publication Year: 2007 , pp. 1-6.*

UML design of vehicular communication service; SungDac Jung; SnagSun Lee; KycongSoo Han; HvunSco Oh; DongYoung Kwak; Advanced Communication Technology, 2009. ICACT 2009. 11th International Conference on; vol. 01 Publication Year: 2009 , pp. 870-872.*

Systematic Data-Driven Approach to Real-Time Fault Detection and Diagnosis in Automotive Engines; Namburu, S.M.; Wilcutts, M.; Chigusa, S.; Liu Qiao; Kihoon Choi; Pattipati, K.; Autotestcon, 2006 IEEE; Digital Object Identifier: 10.1109/AUTEST.2006.283654; Publication Year: 2006 , pp. 59-65.*

Real-Time Remote Onboard Diagnostics Using Embedded GPRS Surveillance Technology; Lin, C. E.; Shiao, Y.-S.; Li, C.-C.; Yang, S.-H.; Lin, S.-H.; Lin, C.-Y.; Vehicular Technology, IEEE Transactions on; vol. 56 , Issue: 3 Digital Object Identifier: 10.1109/TVT.2007.895602; Publication Year: 2007 , pp. 1108-1118.*

Cellular Based Remote Vehicle Data Access; Kumbar, Vinayak S.; Bharadwaj, Sneha; Nagalaxmi, B.V; Jetly, Abhijeet Prem; Automotive Electronics, 2007 3rd Institution of Engineering and Technology Conference on; Publication Year: 2007 , pp. 1-3.*

German Office Action dated Jul. 18, 2008, issued in German Patent Application No. 102004035793.5 (3 pages).

* cited by examiner

VEHICLE INFORMATION-COMMUNICATION METHOD, VEHICLE INFORMATION-COMMUNICATION SYSTEM, VEHICLE AND CONTROL CENTER

INCORPORATION BY REFERENCE

This is a divisional of application Ser. No. 10/892,325, filed Jul. 16, 2004 now U.S. Pat. No. 7,471,999, which claims priority to Japanese Application No. 2003-280376, filed Jul. 25, 2003, both of which are incorporated herein by reference.

BACKGROUND OF THE INVENTION

1. Field of the Invention

The invention relates to a method of communication between a vehicle and a control center, more specifically, a vehicle information-communication method for exchanging vehicle information of the vehicle; a vehicle information-communication system; a vehicle; and a control center.

2. Description of the Related Art

As disclosed in, for example, Japanese Patent-Laid Open Publication No. 62-94443, a vehicular diagnostic system has been known. The vehicular diagnostic system is provided with a self-diagnostic device which diagnoses a failure in a vehicle. When a failure is detected by the self-diagnostic device, the diagnostic result is transmitted to a control center. The control center estimates a cause of the failure based on the obtained diagnostic result, and transmits countermeasures corresponding to the estimated cause of the failure to the vehicle.

In the above vehicular diagnostic system, the vehicle transmits the result of the self-diagnosis to the control center. A user of the vehicle then places the vehicle in an automobile dealer according to the countermeasures transmitted from the control center. In this case, when the vehicle is serviced at the automobile dealer, a failure diagnostic device may be connected to the vehicle, in order to investigate the cause of the failure in detail. When the failure diagnostic device is connected to the vehicle so as to investigate the cause of the failure, an artificially generated failure signal may be provided to the vehicle in order to investigate the cause of the failure. When such an artificially generated failure signal is provided to the vehicle, the vehicle may determine that a failure has occurred, using the self-diagnostic device, and transmit the result of the self-diagnosis to the control center. The result of the self-diagnosis thus transmitted is unnecessary information. Accordingly, communication costs and a load placed on a communication line due to the transmission of such unnecessary information should be suppressed.

SUMMARY OF THE INVENTION

It is an object of the invention to provide a vehicle information-communication method and system, capable of reducing unnecessary data communication.

A first aspect of the invention relates to a vehicle information-communication method in which first information regarding a failure in an in-vehicle unit mounted in a vehicle, the first information being obtained from the in-vehicle unit, is transmitted to a control center adapted to communicate with the vehicle. The vehicle information-communication method includes the following steps of: in the vehicle: obtaining the first information from the in-vehicle unit; determining whether a volume of the first information is larger than a predetermined information volume; and limiting the volume of the first information to be transmitted to the control center to a volume equal to or smaller than the predetermined information volume, when it is determined that the volume of the first information is larger than the predetermined information volume (refer to a flowchart shown in FIG. 6).

According to the first aspect, the vehicle can limit the volume of the first information to be transmitted to the control center to a volume equal to or smaller than the predetermined information volume, when the first information is larger than the predetermined information volume. When the information volume is limited by making a communication time equal to or shorter than a predetermined time, a load placed on a communication line can be reduced, thus preventing occurrence of a communication disturbance.

A second aspect of the invention relates to a vehicle information-communication method in which first information regarding a failure in an in-vehicle unit mounted in a vehicle, the first information being obtained from the in-vehicle unit, is transmitted to a control center adapted to communicate with the vehicle, and is output to a failure diagnostic device which obtains the first information and which diagnoses the failure. The vehicle information-communication method includes the following steps of: in the vehicle: obtaining the first information from the in-vehicle unit; outputting the first information to the failure diagnostic device; and prohibiting transmission of the first information to the control center, when the first information is being output to the failure diagnostic device (refer to a flowchart shown in FIG. 6).

A third aspect of the invention relates to a vehicle information-communication method in which a vehicle and a control center are adapted to communicate with each other, the control center transmits second information, which is used for requesting transmission first information regarding a failure in an in-vehicle unit mounted in the vehicle, to the vehicle, and obtains first information. The vehicle information-communication method includes the following steps of: in the control center: determining whether the first information corresponds to the second information; and prohibiting reception of the first information, when it is determined that the first information does not correspond to the second information (refer to a flowchart shown in FIG. 6). In this case, it is preferable that the first information be information which is transmitted due to connection of a failure diagnostic device, that obtains the first information regarding the failure in the vehicle and that diagnoses the failure, to the vehicle.

According to the above-mentioned aspects, when a cause of a failure is investigated, for example, by artificially generating a failure using the failure diagnostic device, the vehicle does not transmit information regarding the artificially generated failure to the control center. Thus, transmission of unnecessary information, that is, the information regarding the artificially generated failure, is prevented from being transmitted, which drastically reduces communication costs and a load placed on the communication line.

Also, the control center does not receive the transmitted first information regarding the failure, if the first information does not correspond to the second information. In this case, the control center can be prevented from receiving the first information, which is transmitted due to connection of the failure diagnostic device to the vehicle. Therefore, unnecessary information, that is, the information regarding the artificially generated failure is prevented from being transmitted, which drastically reduces communication costs and a load placed on the communication line. Also, unnecessary information can be prevented from being accumulated at the control center.

In the third aspect, the first information may be information which is transmitted due to connection of the failure diagnostic device, that obtains the first information and that diagnoses the failure, to the vehicle.

A fourth aspect of the invention relates to a vehicle information-communication system in which a vehicle and a control center are adapted to communicate with each other, and first information and second information regarding a failure in an in-vehicle unit mounted in the vehicle is exchanged. In the vehicle information-communication system, the vehicle includes an in-vehicle communication network built in the vehicle; an in-vehicle unit connected to the in-vehicle communication network; a communication device which is connected to the in-vehicle communication network so as to receive the second information for requesting transmission of the first information regarding the failure in the in-vehicle unit, the second information being transmitted from the control center, and so as to transmit the first information to the control center; a connection device which is connected to the in-vehicle communication network, and which is connected to a failure diagnostic device that obtains the first information and that diagnoses the failure; a connection determining device which determines whether the failure diagnostic device is connected to the connection device; and a prohibiting device which prohibits the communication device from transmitting the first information to the control center, when the connection determining device determines that the failure diagnostic device is connected to the connection device. In the vehicle information-communication system, the control center includes a transmission requesting device which transmits the second information to the vehicle; a determining device which determines whether the first information corresponds to the second information; and a reception prohibiting device which prohibits reception of the first information, when the determining device determines that the first information does not correspond to the second information.

A fifth aspect of the invention relates to a vehicle including an in-vehicle communication network built in the vehicle; an in-vehicle unit connected to the in-vehicle communication network; a communication device which is connected to the in-vehicle communication network so as to receive second information for requesting transmission of first information regarding a failure in the in-vehicle unit, the second information being transmitted from an external element which can communicate with the vehicle, and so as to transmit the first information to the external element; a connection device which is connected to the in-vehicle communication network, and which is connected to a failure diagnostic device that obtains the first information and that diagnoses the failure; a connection determining device which determines whether the failure diagnostic device is connected to the connection device; and a transmission prohibiting device which prohibits the communication device from transmitting the first information to the external element, when the connection determining device determines that the failure diagnostic device is connected to the connection device.

In the fifth aspect, the communication device can communicate with a control center as the external element which can receive the first information.

A sixth aspect of the invention relates to a control center which is adapted to communicate with the vehicle and which receives first information regarding a failure in an in-vehicle unit, the first information being transmitted from the vehicle. The control center includes a transmission requesting device which transmits second information, that is for requesting the vehicle to transmit the first information, to the vehicle; a determining device which determines whether the first information corresponds to the second information; and a reception prohibiting device which prohibits reception of the first information, when the determining device determines that the first information does not correspond to the second information.

A seventh aspect of the invention relates to a vehicle information-communication system in which a vehicle and a control center are adapted to communicate with each other, and first information and second information regarding a failure in an in-vehicle unit mounted in the vehicle is exchanged. In the vehicle information-communication system, the vehicle includes an in-vehicle communication network built in the vehicle; an in-vehicle unit connected to the in-vehicle communication network; communication means for receiving the second information for requesting transmission of the first information a failure in the in-vehicle unit, the second information being transmitted from the control center, and for transmitting the first information to the control center, the communication means being connected to the in-vehicle communication network; connection means connected to the in-vehicle communication network, and connected to a failure diagnostic device that obtains the first information and that diagnoses the failure; connection determining means for determining whether the failure diagnostic device is connected to the connection means; and prohibiting means for prohibiting the communication means from transmitting the first information to the control center, when the connection determining means determines that the failure diagnostic device is connected to the connection means. In the vehicle information-communication system, the control center includes transmission requesting means for transmitting the second information to the vehicle; determining means for determining whether the first information corresponds to the second information; and reception prohibiting means for prohibiting reception of the first information, when the determining means determines that the first information does not correspond to the second information.

An eighth aspect of the invention relates to a vehicle including an in-vehicle communication network built in the vehicle; an in-vehicle unit connected to the in-vehicle communication network; communication means for receiving second information for requesting transmission of first information regarding a failure in the in-vehicle unit, the second information being transmitted from an external element that can communicated with the vehicle, and for transmitting the first information to the external element, the communication means being connected to the in-vehicle communication network; connection means connected to the in-vehicle communication network, and connected to a failure diagnostic device that obtains the first information and that diagnoses the failure; connection determining means for determining whether the failure diagnostic device is connected to the connection means; and prohibiting means for prohibiting the communication means from transmitting the first information to the external element, when the connection determining means determines that the failure diagnostic device is connected to the connection means.

A ninth aspect of the invention relates of a control center which is adapted to communicate with the vehicle, and which receives first information regarding a failure in an in-vehicle unit transmitted from the vehicle. The control center includes transmission requesting means for transmitting second information, which is used for requesting the vehicle to transmit the first information, to the vehicle; determining means for determining whether the first information corresponds to the second information; and reception prohibiting means for prohibiting reception of the first information, when the determining means determines that the first information does not correspond to the second information.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
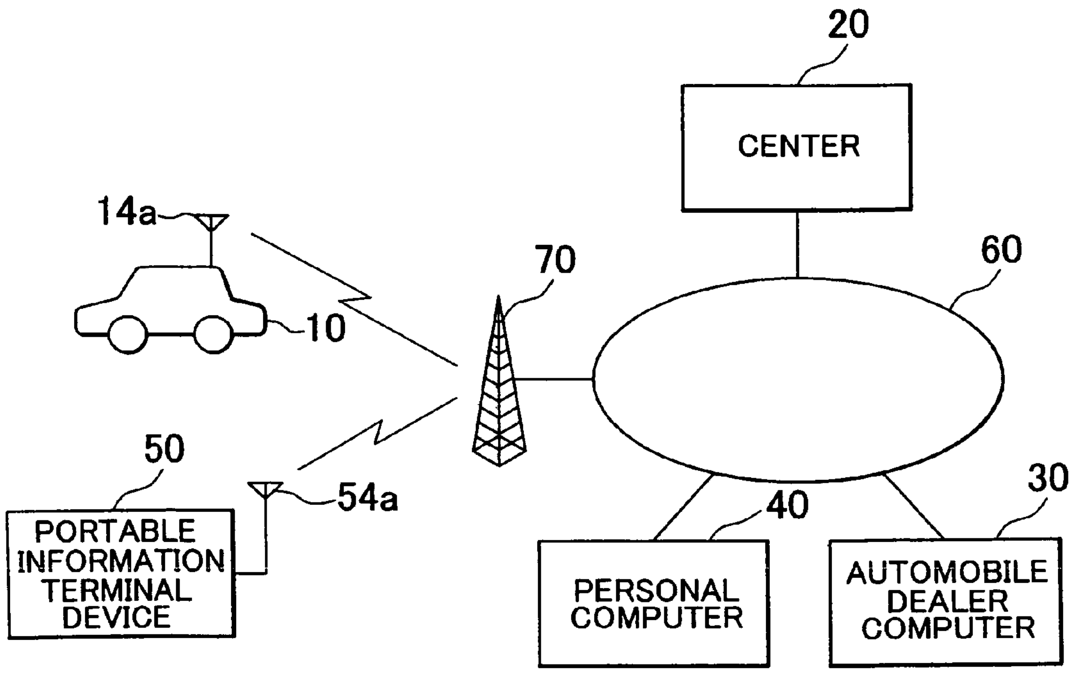
FIG. 1 is a block diagram schematically showing an entire vehicular diagnostic system according to an embodiment of the invention.

Hereafter, an embodiment of the invention will be described in detail with reference to accompanying drawings. FIG. 1 is a block diagram schematically showing a vehicular diagnostic system according to the embodiment. The vehicular diagnostic system includes a vehicle 10, a control center 20 which can communicate with the vehicle 10, an automobile dealer computer 30 which is provided in an automobile dealer selling vehicles and performing servicing, a personal computer 40 and a portable information terminal device 50 which can be used by a user. The vehicle 10 and the portable information terminal device 50 can wirelessly communicate with a transmission site 70 connected to a network 60 (e.g., the Internet). The control center 20, the automobile dealer computer 30 and the personal computer 40 are connected to the network 60.

Figure 2:
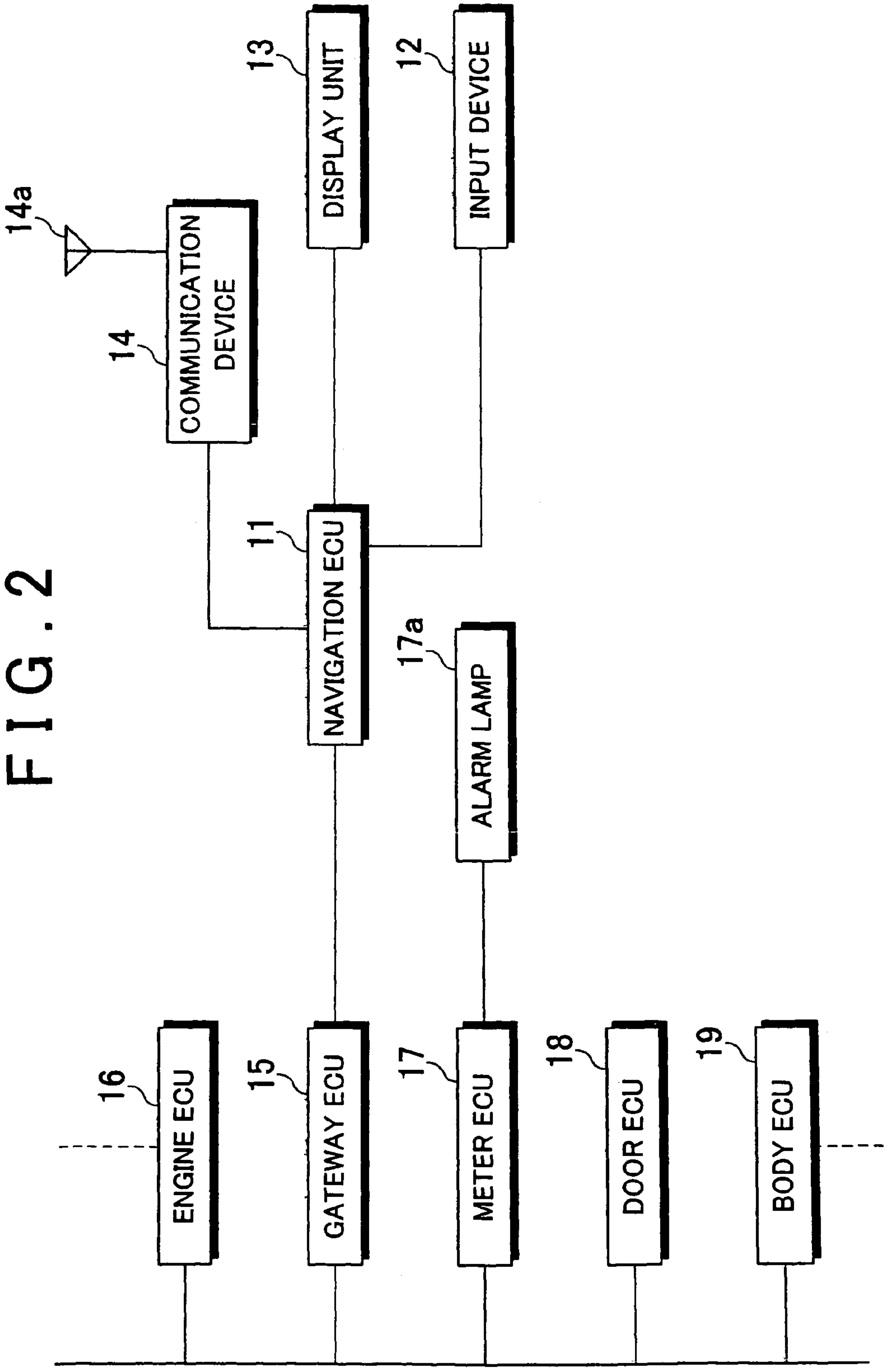
FIG. 2 is a block diagram schematically showing a vehicle shown in FIG. 1.

As shown in FIG. 2, the vehicle 10 includes a navigation ECU 11 which provides overall control of a navigation unit that searches for a route to a destination set by the user and that provides the obtained route by display or by voice. The navigation ECU 11 is a computer mainly including a CPU, ROM, RAM and the like. An input device 12, a display unit 13, and a communication device 14 are connected to the navigation ECU 11.

The input device 12 includes an operation switch provided near the display unit 13, a panel touch switch which is incorporated in the display unit 13 and which detects a touch operation of a display panel, and the like. An instruction from the user is input in the input device 12. The input device 12 then outputs information corresponding to the instruction input by the user to the navigation ECU 11. The display unit 13 includes a liquid crystal display and the like, and displays characters, graphics, and the like on the display panel based on the provided various types of information.

The communication device 14 is undetachably mounted in the vehicle 10, and can communicate with the control center 20 via the transmission site 70. The communication device 14 is provided with identification information (hereinafter, referred to as MAC (Media Access Control) address information) for identifying the communication device 14 during manufacturing. Also, vehicle ID information (e.g., vehicle number information indicating a vehicle number assigned to the vehicle 10 during manufacture, and a registration number provided by the motor vehicle official) assigned to the vehicle 10 is stored in the communication device 14 in advance. By making a contract with the control center 20, a user name, user ID information and a user password (hereinafter, these are collectively referred to as “user identification information”) and mail address information used for communication with the control center 20 are stored in the communication device 14 in advance. An antenna **14*a* which wirelessly communicates with the transmission site 70 is connected to the communication device 14**.

A gateway ECU 15 and the navigation ECU 11 adapted to communicate with each other via a network (e.g., LAN (Local Area Network)) built in the vehicle 10. The gateway ECU 15 is a computer mainly including a CPU, ROM RAM and the like. The gateway ECU 15 is connected to an engine ECU 16, a meter ECU 17, a door ECU 18, a body ECU 19 and the like adapted to communicate with the ECUs 16, 17, 18 and 19 via the network built in the vehicle 10. Each of the ECUs 16, 17, 18 and 19 is a computer mainly including a CPU, ROM and RAM. Other than the ECUs 16, 17, 18 and 19, various ECUs are mounted in the vehicle 10. In the embodiment, however, description will be made, taking the ECUs 16, 17, 18 and 19 as examples.

The gateway ECU 15 provides overall control of the flow of control signals for controlling various data shared by the ECUs 16, 17, 18 and 19, and cooperation among the ECUs 16, 17, 18 and 19. The gateway ECU 15 provides the meter ECU 17 with alarm lamp illumination information indicating an alarm lamp illumination request which is output when an abnormality has occurred in the devices whose operation is controlled by the ECUs 18 and 19, and provides overall control of the flow of the failure information (diagnosis information) indicating details of the abnormality which has occurred in the ECUs 16, 17, 18 or 19.

The engine ECU 16 controls the operation of the engine based on the data and signals detected by various sensors (e.g., an engine rotational speed sensor and a battery voltage sensor) attached to the engine and auxiliaries (not shown). The meter ECU 17 controls various types of information displayed on meter devices (not shown) based on the data and signals detected by various sensors (e.g., a vehicle speed sensor and a coolant temperature sensor). The meter ECU 17 controls illumination of a plurality of alarm lamps 17*a* based on the alarm lamp information output from the engine ECU 16 and alarm lamp illumination information output from the ECUs 18 and 19 via the gateway ECU 15, and notifies the user of an abnormality.

The door ECU 18 is attached to a door lock device (not shown), and controls the operation of the door lock device based on data and signals detected by various sensors (e.g., a remote control opening/closing detecting sensor and a door lock sensor). The body ECU 19 controls ON/OFF of the lamp based on signals input from various switches (e.g., a light control switch and a door courtesy lamp switch) attached to a vehicle body (body) (not shown).

Note that control performed by the ECUs 15, 16, 17, 18 and 19 is not limited to the above-mentioned control. Also, concrete processing programs and concrete control methods of the ECUs 16, 17, 18 and 19 are not related to the invention directly. Therefore, detailed description of the programs and methods is omitted in the specification.

Figure 3:
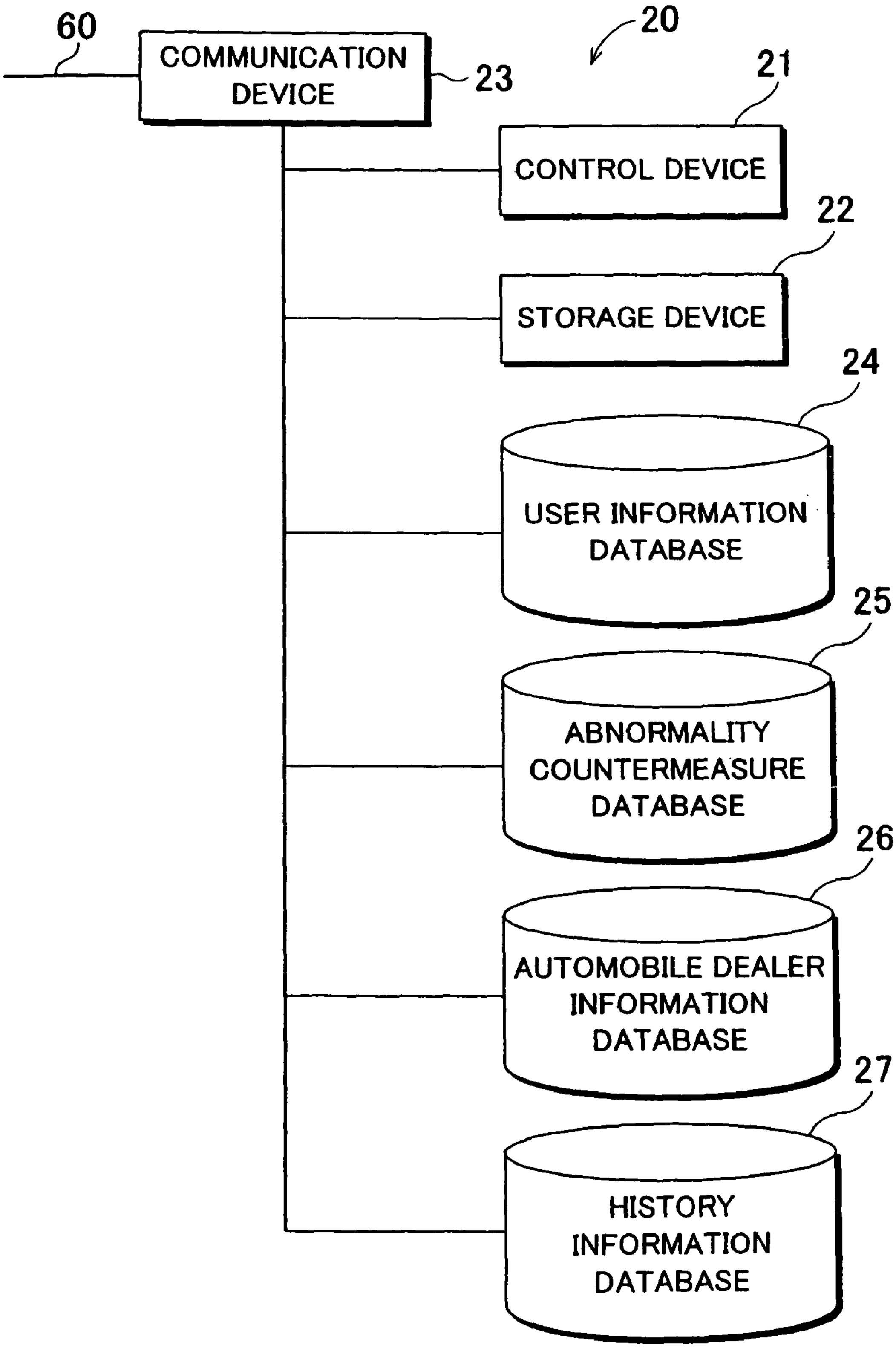
FIG. 3 is a block diagram schematically showing a control center shown in FIG. 1.

As shown in FIG. 3, the control center 20 is provided with a control device 21, a storage device 22 and a communication device 23 adapted to communicate with each other. The control device 21 includes a computer mainly provided with a CPU, ROM, RAM and the like, and provides overall control of the operation of the control center 20. The storage device 22 includes a recording medium such as a hard disk, and a drive device for the recording medium, and stores various programs and various data. The communication device 23 is wired to the network 60 so as to perform wire communication with the automobile dealer computer 30 and the personal computer 40 which can be used by the user, and wirelessly communicate with the vehicle 10 and the portable information terminal device 50 via the transmission site 70.

A user information database 24, an abnormality countermeasure database 25, an automobile dealer information database 26 and a history information database 17 are built in the control center 20. The databases 24, 25, 26 and 27 are connected to the network (e.g., LAN) built in the control center 20, and is accessible from the control device 21.

The vehicle ID information regarding the vehicle 10, the MAC address information assigned to the communication device 14 of the vehicle 10, and the mail address information; the automobile dealer identification information indicating the automobile dealer which sold the vehicle 10; and the user identification information are linked to each other, and stored in the user information database 24. In order to allow for access from the personal computer 40 or the portable information terminal device 50, the MAC address information of the devices 40 and 50 and the mail address information used by the devices 40 and 50 for communication with the control center 20, and the user identification information are linked to each other and stored in the user information database 24.

The abnormality countermeasure database 25, as will be described later in detail, stores base sentences of countermeasures to be notified to the user of the vehicle 10 (hereinafter, referred to as "default sentences") for each type of abnormalities indicated in the alarm lamp illumination information transmitted from the vehicle 10. An example of the default sentences is as follows; "an abnormality may have occurred in the system. Therefore, we will perform an inspection for safety. Please have your vehicle serviced. We apologize for the inconvenience". This is for the alarm lamp illumination information indicating an abnormality in the system.

The automobile dealer information database 26 stores business days, business hours and the like (hereinafter, referred to as "automobile dealer information") of each automobile dealer. The automobile dealer information can be updated by accessing the control center 20 through the use of the automobile dealer computer 30. Also, the time at which an after-mentioned abnormality notification is transmitted to the user can be stored in the automobile dealer information database 26 in advance. The control center 20 can provide the user of the vehicle 10 with various types of service corresponding to the business days and business hours of each automobile dealer, based on the information stored in the automobile dealer information database 26. For example, in the case of servicing of the vehicle 10, the information (e.g., an e-mail) for displaying a button, which is used for making a phone call to the automobile dealer that can provide the service, on the display unit 13 is transmitted and displayed, based on the business days and business hours of the automobile dealer.

As described later in detail, the history of the alarm lamp illumination transmitted from the vehicle 10 and the countermeasures corresponding to the illuminated alarm lamp, and the vehicle ID information and the user identification information are linked to each other and stored in the history information database 27.

The automobile dealer computer 30 mainly includes a CPU, ROM, RAM and the like, and is provided with an input device, a display unit, a control device, a storage device and a communication device. The automobile dealer computer 30 can access the control center 20 through the operation performed by a person responsible at the automobile dealer. The automobile dealer computer 30 transmits various types of information (the abnormality countermeasure information, the automobile dealer information and the like) to the control center 20, and receives various types of information (the alarm lamp illumination information, the failure information and the like) from the control center 20. The person responsible at the automobile dealer can search for and obtain the entire information regarding the control center 20 (e.g., the history information database 26) by accessing the control center 20 through the use of the automobile dealer computer 30. The vehicle ID information regarding the vehicle sold at the automobile dealer and the customer information including the name of the vehicle user are linked to each other and stored in the storage device of the automobile dealer computer 30.

The personal computer 40 which can be used by the user mainly includes a CPU, ROM, RAM and the like, and is provided with an input device, a display unit, a control device, a storage device and a communication device. The personal computer 40 can access the control center 20 through the operation performed by the user, and obtains the alarm lamp information and the countermeasures from the history information database 27 of the control center 20.

The portable information terminal device 50 mainly includes a CPU, ROM, RAM and the like, and is provided with an input device, a display unit, a control device, a storage device and a communication device. The portable information terminal device 50 is compact in size so as to be portable. An antenna 54*a*, which enables wireless communication with the transmission site 70, is provided in the communication device of the portable information terminal device 50. The portable information terminal device 50 can access the control center 20 through the operation performed by the user, and obtains the alarm lamp illumination information and the countermeasures from the history information database 27 of the control center 20. As the portable information terminal device 50, a cellular phone, a portable personal computer having a communication function, a personal digital assistant (PDA) or the like can be employed.

In the thus configured vehicular diagnostic system, communication among the communication device 14 of the vehicle 10, the control center 20, the automobile dealer computer 30, the personal computer 40 and the portable information terminal device 50 is wirelessly performed via the antennas 14*a* and 54*a*, and the transmission site 70, or performed via wire through the network 60. This communication is performed in a normal method, and does not have distinctive characteristics. Therefore, in the description below, when the term, "transmission" or "reception" is used, a suitable method for communication is employed for transmission/reception.

Figure 4A:
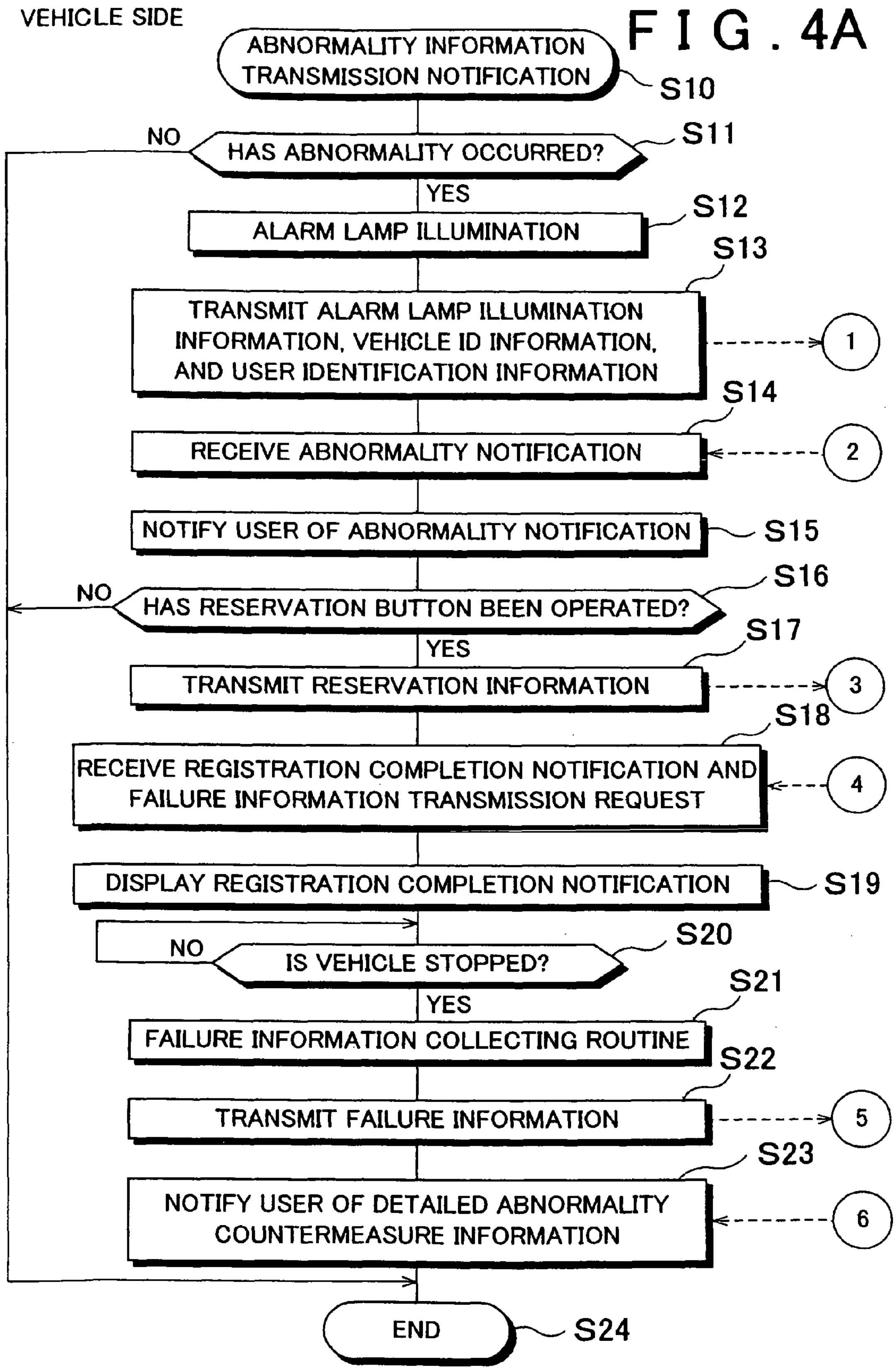
FIGS. 4A, 4B and 4C is a flowchart of an abnormality information transmission notifying program performed by the vehicle, the control center and an automobile dealer personal computer shown in FIG. 1.

Next, an operation of the thus configured vehicular diagnostic system will be described in detail. When an ignition switch (not shown) is turned ON by the user of the vehicle 10, the ECUs 11, 15, 16, 17, 18 and 19 mounted in the vehicle 10 respectively control the operation of the devices. The navigation ECU 11, the gateway ECU 15 and the meter ECU 17 repeatedly perform an abnormality information transmission notifying program shown in FIG. 4A at predetermined short intervals in cooperation with each other. In the abnormality information transmission notifying program, the routine is started in step S10, and the meter ECU 17 determines whether an abnormality has occurred in the vehicle 10 in step S11. The determination will be described in detail, taking the case where an abnormality has occurred in the engine as an example.

The engine ECU 16 controls the operation state of the engine based on signals output from the various sensors attached to the engine and the auxiliaries. In the case where the engine is operating, when a signal indicative of an engine rotational speed output from the engine rotational speed sensor indicates an abnormality, the engine ECU 16 outputs the alarm lamp illumination information to the meter ECU 17 such that the alarm lamp indicating an abnormality in the engine illuminates. The door ECU 18 and the body ECU 19 output the alarm lamp illumination information to the meter ECU 17 via the gateway ECU 15.

The meter ECU 17 recognizes occurrence of an abnormality in the vehicle 10 by obtaining the alarm lamp illumination information output from the engine ECU 16. When obtaining the alarm lamp illumination information, the meter ECU 17 makes an affirmative determination in step S11 since an abnormality has occurred in the vehicle 10, afterwhich step S12 is performed. On the other hand, when not obtaining the alarm lamp illumination information, the meter ECU 17 makes a negative determination in step S11 since an abnormality has not occurred in the vehicle 10. Then, the abnormality information transmission notifying program temporarily ends in step S24.

In step S12, the meter ECU 17 performs illumination control of the alarm lamp 17*a* corresponding to the alarm lamp illumination information obtained in step S11. The user can thus recognize occurrence of an abnormality in the vehicle 10.

The illumination operation of the alarm lamp can be performed as described below. The meter ECU 17 obtains information (bit data) regarding illumination of the alarm lamp output from the ECUs 16, 18, and 19, and stores the information in the RAM. The meter ECU 17 then compares the bit data stored in the RAM with the bit data newly output from the ECUs 16, 18 and 19. If there is a change in the bit data, the meter ECU 17 illuminates the corresponding alarm lamp. The alarm lamp can be thus illuminated considerably easily.

Figure 9A:
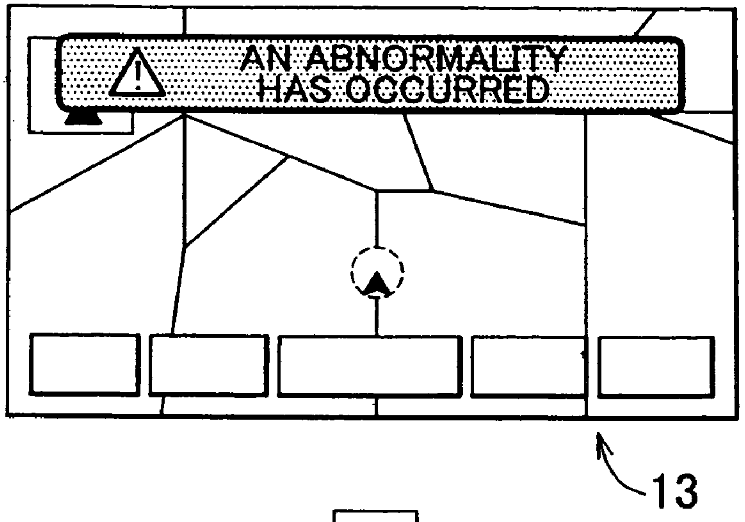
FIGS. 9A and 9B are views for describing a display screen of a display unit when an abnormality occurs in the vehicle.
Figure 9B:
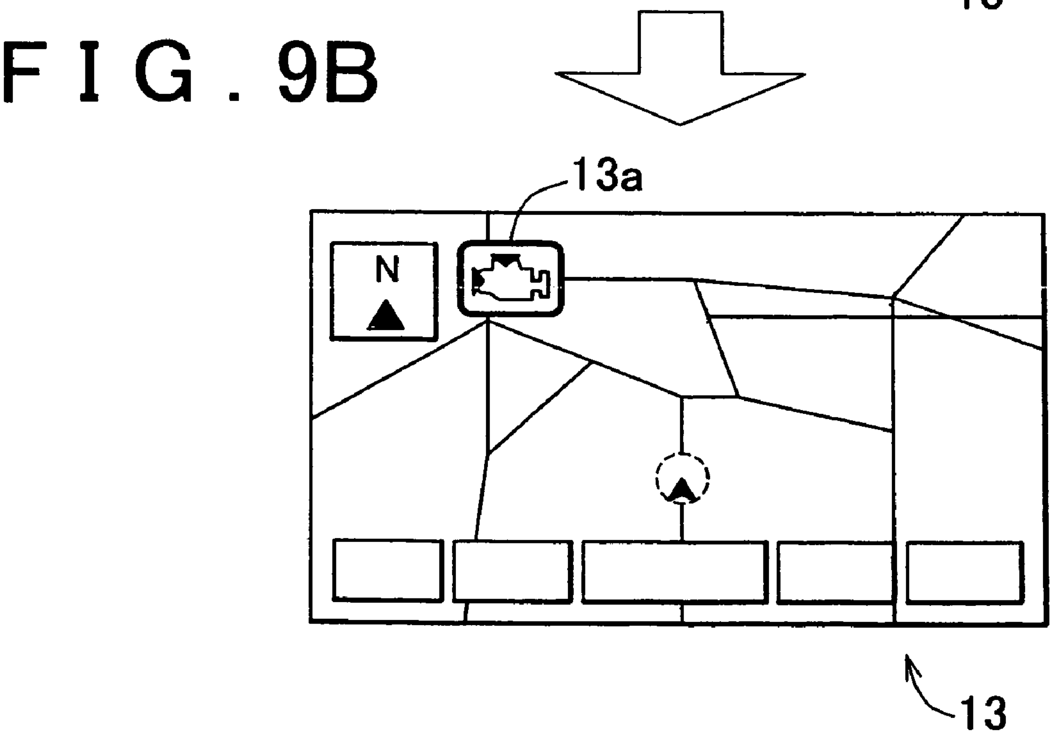

The meter ECU 17 provides the obtained alarm lamp illumination information to the navigation ECU 11 via the gateway ECU 15. The navigation ECU 11 obtains the provided alarm lamp illumination information, and provides the obtained alarm lamp illumination information to the display unit 13. When obtaining the provided alarm lamp illumination information, the display unit 13 displays a message indicating occurrence of an abnormality in the vehicle 10 on a liquid crystal display, as shown in FIG. 9A. When a predetermined time has elapsed since the massage was displayed, as shown in FIG. 9B, the display unit 13 deletes the message and displays an alarm icon 13*a* indicating occurrence of an abnormality in the engine on the liquid crystal display so as to continue notifying the user of the occurrence of the abnormality.

After step S12 is performed, the navigation ECU 11 transmits the alarm lamp illumination information, the vehicle ID information and the user ID information to the control center 20 using the communication device 14 in step S13. More particularly, the navigation ECU 11 provides the communication device 14 with the alarm lamp illumination information obtained in step S12, and instructs the communication device 14 to transmit the vehicle ID information and the user identification information as well as the alarm lamp illumination information. The communication device 14 obtains the alarm lamp illumination information, and transmits the alarm lamp illumination information, the vehicle ID information and the user identification information to the control center 20. At this time, the communication device 14 also transmits the MAC address information assigned thereto to the control center 20.

In the control center 20, in step C10, the alarm lamp illumination information, the vehicle ID information, the user identification information and the MAC address information of the communication device 14 transmitted in S13 are received by the control device 21, and temporarily stored in the RAM (not shown), afterwhich step C11 is performed.

In step C11, the control device 21 transmits the alarm lamp illumination information temporarily stored in the RAM in step C10 to the automobile dealer computer 30. This transmission process will be described in detail. The control device 21 obtains the vehicle ID information and the user identification information temporarily stored in the RAM in step C10, and searches the user information database 24 based on the obtained information. The control device 21 then obtains the stored automobile dealer information linked to the vehicle ID information and the user identification information. When obtaining the automobile dealer information, the control device 21 transmits the alarm lamp illumination information and the vehicle ID information to the automobile dealer indicated in the automobile dealer information (more specifically, the automobile dealer computer 30) via the communication device 23 and the network 60.

In the automobile dealer, in step D10, the alarm lamp illumination information and the vehicle ID information transmitted from the control center 20 in step C11 are received by the automobile dealer computer 30, and temporarily stored in the RAM (not shown). In this case, when receiving the alarm lamp illumination information and the vehicle ID information from the control center 20, the automobile dealer computer 30 displays a message indicating reception of the alarm lamp illumination information, for example, "alarm lamp illumination information is received", on the display screen of the display unit (not shown) so as to notify the person responsible or the engineer at the automobile dealer (hereinafter, referred to as the "person(s) responsible") of the reception of the information. When the message is displayed, the person(s) responsible operates the automobile dealer computer 30, and decides the abnormality countermeasure information to be transmitted to the vehicle 10 so as to deal with the abnormality indicated by the illuminated alarm lamp.

The abnormality countermeasure information will be described in detail. The abnormality countermeasure information is prepared by each automobile dealer. More particularly, the person(s) responsible operates the automobile dealer computer 30 and accesses the abnormality countermeasure database 25 of the control center 20 in advance so as to obtain the default sentences stored in the abnormality countermeasure database 25. The person(s) responsible adds necessary items (e.g., a greeting) to the default sentences obtained from the control center 20 so as to prepare the abnormality countermeasure information specific to the automobile dealer. For example, as a necessary item, a greeting such as "we would like to express our thanks for your loyal patronage" is added to the default sentences, "an abnormality may have occurred in the system. Therefore, we will perform an inspection for safety. Please have your vehicle serviced. We apologize for the inconvenience". The abnormality countermeasure information is thus prepared and stored in the storage device. Note that it is obvious that the abnormality countermeasure information is prepared for each type of abnormalities.

When receiving the alarm lamp illumination information in step D10, the person(s) responsible selects and decides the optimum abnormality countermeasure information in all the abnormality countermeasure information stored in the storage device, for the received alarm lamp illumination information. Also, by referring to the customer information stored in the storage device of the automobile dealer computer 30, the person(s) responsible can select the method for handling the user name attached to the abnormality notification prepared by the "abnormality notification preparing routine" performed by the control center 20.

When the abnormality notification is transmitted to the vehicle 10, there is a possibility that the vehicle 10 is running and the abnormality notification is output by voice. There may be various ways to read the user name, and the user may feel discomfort if the user name is read wrongly. Therefore, the person(s) responsible selects whether to read the user name attached to the transmitted abnormality notification when deciding the abnormality countermeasure information. The information indicative of the selection made by the person(s) responsible is added to the decided abnormality countermeasure information. The person(s) responsible can designate the time at which the abnormality notification is transmitted for the abnormality countermeasure information. The control center 20 can thus transmit the abnormality notification at the designated time.

When the optimum abnormality countermeasure information is decided by the person(s) responsible, in step D11, the automobile dealer computer 30 transmits the decided abnormality countermeasure information to the control center 20 via the network 60.

In the control center 20, in step C12, the abnormality countermeasure information transmitted from the automobile dealer computer 30 in step D11 is received by the control device 21, and temporarily stored in the RAM (not shown), afterwhich step C13 is performed. In step C13, the alarm lamp illumination information received in step C10, the abnormality countermeasure information received in step C12 and the date and time when the alarm lamp illumination information is received are linked to each other, and stored in the history information database 27 by the control device 21.

Figure 5:
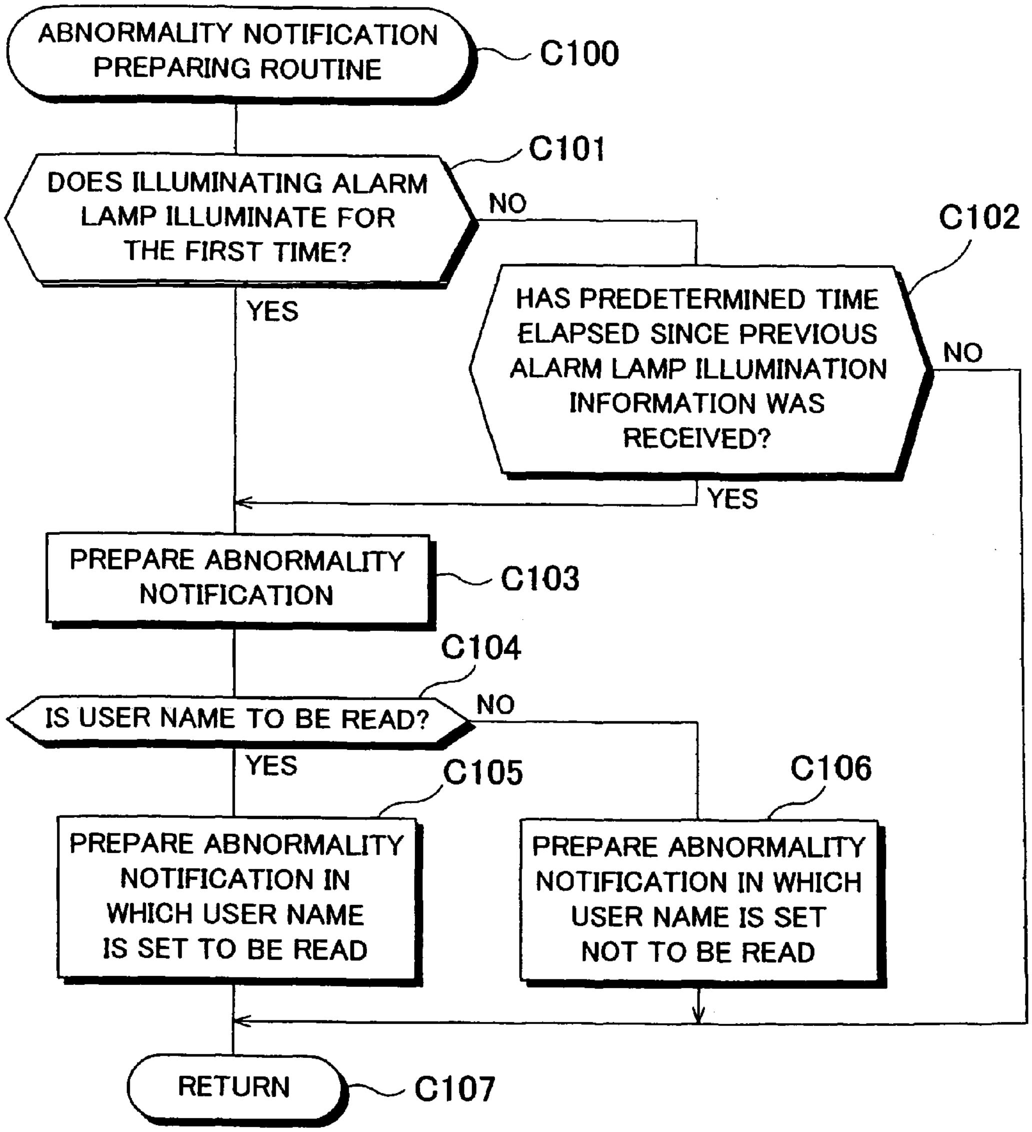
FIG. 5 is a flowchart of an abnormality notification preparing routine performed by the control center shown in FIG. 1.

After step C13 is performed, the control device 21 performs the "abnormality notification preparing routine" in step C14. As shown in FIG. 5, the "abnormality notification preparing routine" is started in step C100. In step C101, the control device 21 determines whether the illuminating alarm lamp illuminates for the first time. Namely, the control device 21 searches for the alarm lamp illumination information stored in the history information database 27 using the alarm lamp illumination information received in step C10. As a result of the search, when the same alarm lamp illumination information is not stored in the history information database 27, it can be determined that the alarm lamp illuminates for the first time. Therefore the control device 21 makes an affirmative determination, and step C103 is then performed.

On the other hand, as a result of the search of the history information database 27, when the same alarm lamp illumination information is stored, it can be determined that the alarm lamp has illuminated before, that is, this is not the first time the alarm lamp illuminates. Therefore, the control device 21 makes a negative determination, and step C102 is then performed. In step C102, the control device 21 determines whether the present alarm lamp illumination information is received after a predetermined time (e.g., 7 days) has elapsed since the previous alarm lamp illumination information was received. More particularly, the control device 21 compares the date and time when the present alarm lamp illumination information is received with the date and time, which is stored in the history information database 27, when the previous alarm lamp illumination information was received. The control device 21 thus determines whether the predetermined time has elapsed since the previous alarm lamp illumination information was received.

When it is determined that the predetermined time has elapsed since the previous alarm lamp illumination information was received, the control device 21 makes an affirmative determination, and step C103 is then performed. On the other hand, when it is determined that the predetermined time has not elapsed since the previous alarm lamp illumination information was received, the control device 21 makes a negative determination, and the "abnormality notification preparing routine" ends in step C107.

By determining whether the present alarm lamp illumination information is received after the predetermined time has elapsed since the previous alarm lamp illumination information was received, the same abnormality notification can be prevented from being transmitted to the vehicle 10 more frequently than is necessary. This prevents the user from receiving the same abnormality notification more frequently than is necessary, which minimizes confusion felt by the user.

In step C103, the control device 21 prepares the abnormality notification (e-mail) to be transmitted to the vehicle 10. The preparation of the abnormality notification will be described below in detail. The control device 21 prepares the abnormality notification in a predetermined format using an abnormality notification format set in advance (e.g., HTML format, or XML format). The control device 21 obtains the user identification information temporarily stored in the RAM, and searches the user information database 24 using the user identification information. Then, in all the user identification information stored in the user information database 24, the control device 21 searches for the user identification information matching the user identification information temporarily stored in the RAM, and extracts the matching user identification information. The control device 21 then obtains the mail address linked to the extracted user identification information.

Next, the control device 21 obtains the abnormality countermeasure information received from the automobile dealer computer 30 in step C12 and temporarily stored in the RAM.

The control device 21 then incorporates the information indicating the user name, which is included in the user identification information, and the abnormality countermeasure information into the abnormality notification format. Thus, the user name can be indicated in the abnormality notification, when the abnormality notification is transmitted to the vehicle 10 and indicated. The control device 21 thus prepares the abnormality notification, and step C104 is then performed.

The number of the pieces of the alarm lamp illumination information transmitted from the vehicle 10 is not limited to one. Various types of the alarm lamp illumination information may be transmitted. In this case, the control device 21 classifies the alarm lamp illumination information into plural groups depending on the type of information in advance (e.g., the alarm lamp illumination information related to maintenance and the alarm lamp illumination information related to an abnormality in the system). The control device 21 then incorporates the abnormality notifications for the plural pieces of alarm lamp illumination information into one piece of abnormality notification, according to the following rules.

When receiving plural pieces of alarm lamp illumination information related to maintenance, the control device 21 incorporates these pieces of information into one piece of maintenance warning information, and automatically prepares the abnormality notification for the maintenance warning information. At this time, since having received the abnormality countermeasure information for each alarm lamp illumination information from the automobile dealer computer 30, the control device 21 prepares the abnormality notification including all the abnormality countermeasure information.

When receiving plural pieces of alarm lamp illumination information related to an abnormality in the system, the control device 21 incorporates these pieces of information into one piece of system warning information, and automatically prepares the abnormality notification for the system warning information. At this time, since having received the abnormality countermeasure information for each alarm lamp illumination information from the automobile dealer computer 30, the control device 21 prepares the abnormality notification including all the abnormality countermeasure information.

When receiving both the alarm lamp illumination information related to maintenance and the alarm lamp illumination information related to an abnormality in the system, the control device 21 incorporates these pieces of information into one piece of system warning information. This is because the alarm lamp illumination information related to an abnormality in the system has a larger effect on the running state of the vehicle than the alarm lamp illumination information related to maintenance. The control device 21 then automatically prepares the abnormality notification for the system warning information. At this time, the control device 21 has received the abnormality countermeasure information for the alarm lamp illumination information related to an abnormality in the system from the automobile dealer computer 30. Therefore, the control device 21 prepares the abnormality notification by including all the received abnormality countermeasure information, and including the state where the abnormality has occurred based on the alarm lamp illumination information related to maintenance.

Incorporating plural pieces of alarm lamp illumination information into one abnormality notification reduces the number of times that the abnormality notification is transmitted to the vehicle 10. Communication cost can be thus reduced, which prevents confusion over the abnormality notification felt by the user.

Next, in step C104, the control device 21 determines whether the user name included in the abnormality notification prepared in step C103 is set to be read. Namely, the control device 21 detects selection information about whether the user name is read, the selection information being added to the abnormality countermeasure information by the person (s) responsible at the automobile dealer. When the selection information indicates that the user name is to be read, the control device 21 makes an affirmative determination, and step C105 is then performed.

In step C105, the control device 21 makes the setting such that the user name included in the abnormality notification prepared in step C103 is read. In the embodiment, the abnormality notification is prepared in the XML format or the HTML format. Therefore, when the abnormality notification is transmitted to the vehicle 10 and output by voice as it is, the user name can be read. Accordingly, when the abnormality notification is prepared in such a format, the setting process in step C105 may be a process where the setting of the abnormality notification is not changed. After step C105 is performed, the "abnormality notification preparing routine" ends in step C107.

On the other hand, when the detected selection information indicates that the user name is not to be read, the control device 21 makes a negative determination in step C104, and step C106 is then performed. In step C106, the control device 21 makes the setting such that the user name included in the abnormality notification prepared in step C103 is not read. Since the abnormality notification is prepared in the XML format or the HTML format, by applying a predetermined command (e.g., ¥¥ user name ¥¥) to the description corresponding to the user name, setting is made such that the user name is not read. After step C106 is performed, the "abnormality notification preparing routine" ends in step C107.

Figure 4B:
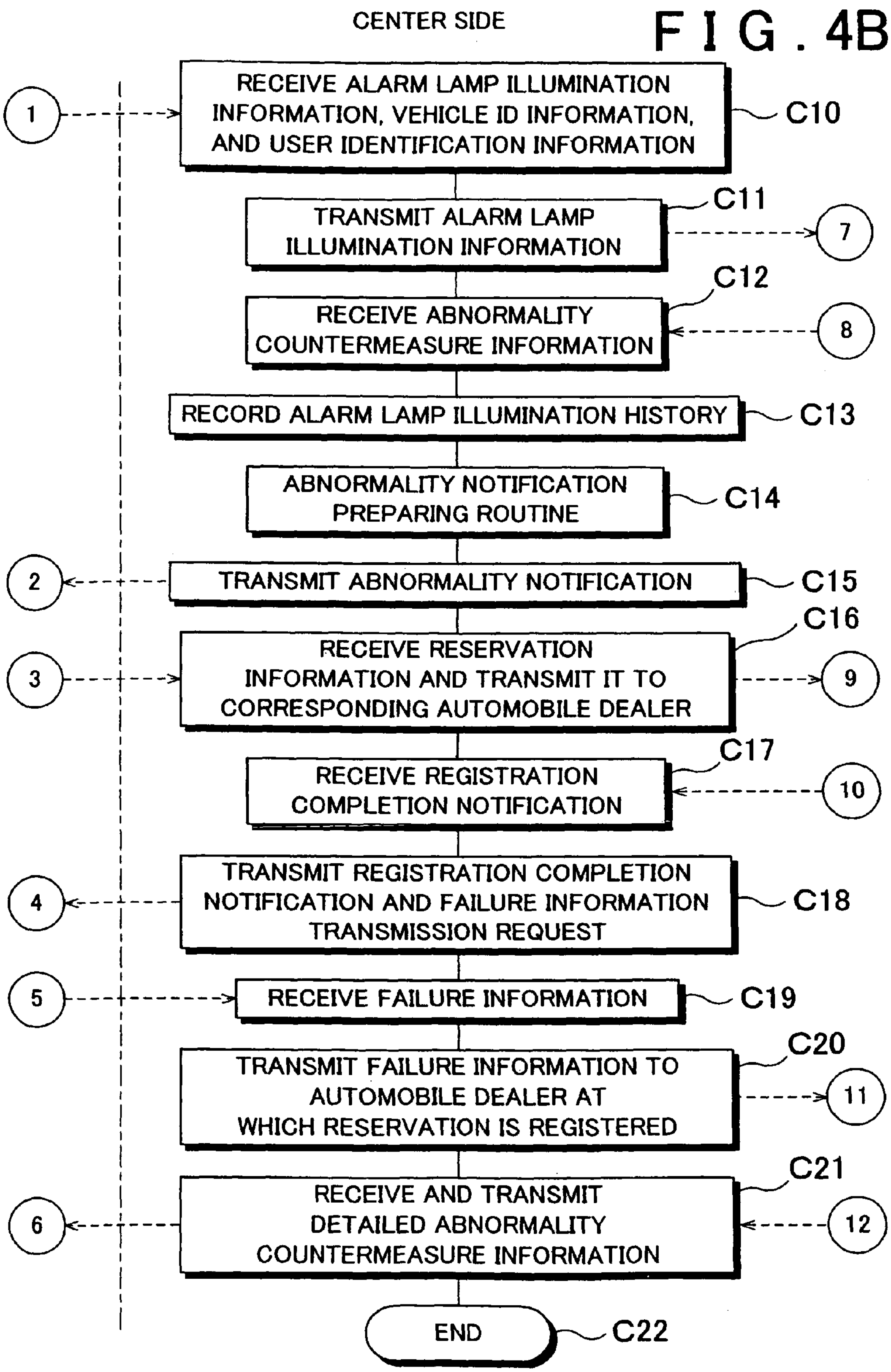

Then, the process returns to the flowchart in FIG. 4B. After the abnormality notification preparing routine" is performed in step C14, step C15 is performed. In step C15, the control device 21 transmits the abnormality notification prepared in step C14 to the vehicle 10. Namely, the control device 21 transmits the abnormality notification to the vehicle 10 via the communication device 23 and the transmission site 70 connected to the network 60. In this transmission, the control device 21 can check the time at which the abnormality notification stored in the automobile dealer information database 26 may be transmitted, and then transmit the abnormality notification. In this case, the control device 21 transmits the abnormality notification to the vehicle 10 at the transmission time set in advance. Accordingly, for example, when the user designates the abnormality notification transmission time and notifies the automobile dealer of the designated time in advance, the user can receive the abnormality notification at the designated time. Therefore, the user can suitably receive the abnormality notification.

Figures 10A, 10B, 10C:
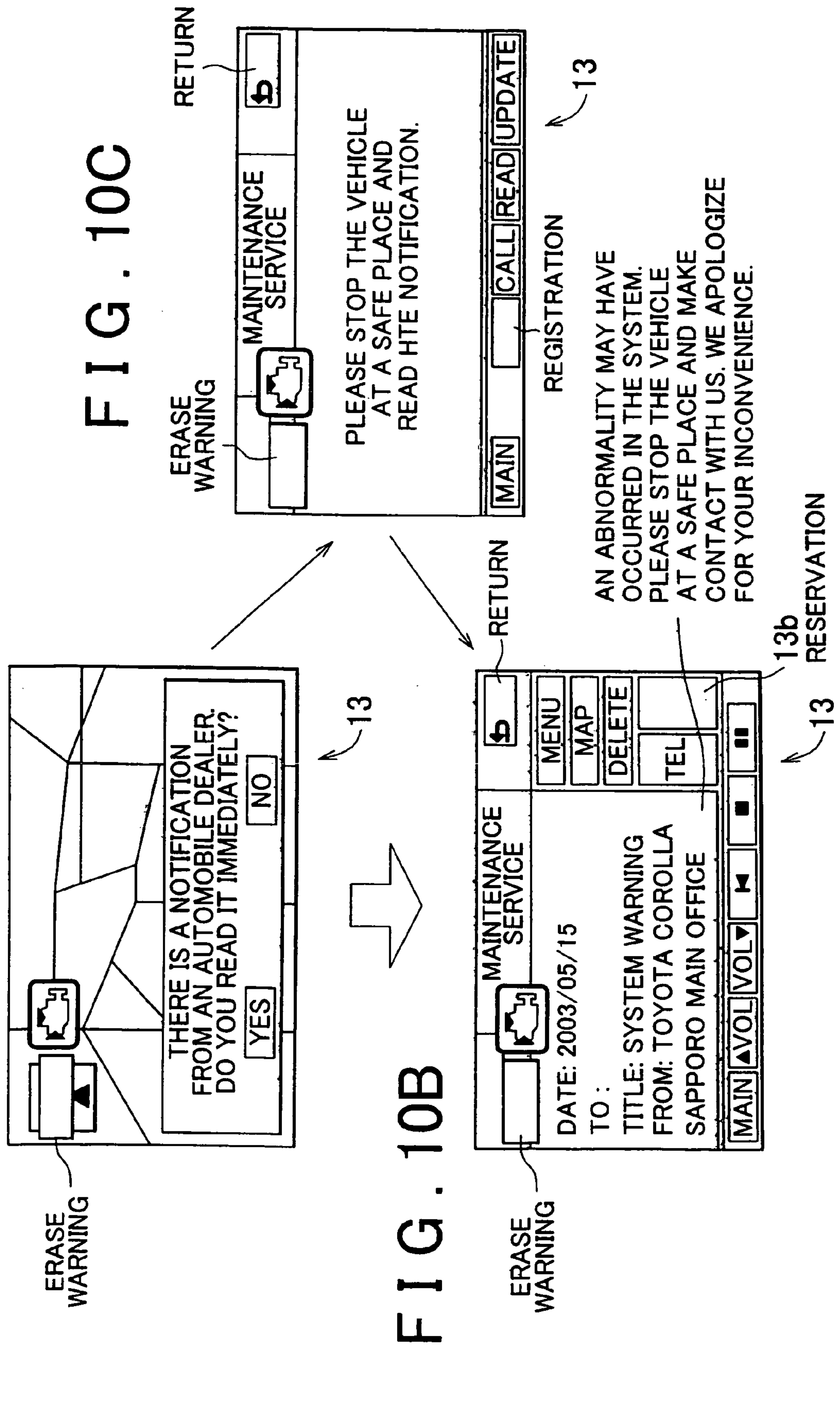
FIGS. 10A, 10B, and 10C are views for describing the display screen of the display unit when the vehicle receives an abnormality notification.

In the vehicle 10, in step S14, the communication device 14 receives the abnormality notification transmitted in step C15, and provides the received abnormality notification to the navigation ECU 11. When obtaining the abnormality notification from the communication device 14, the navigation ECU 11 notifies the user of the obtained abnormality notification in step S15. More particularly, the navigation ECU 11 provides the abnormality notification to the display unit 13, and instructs the display unit 13 to display the abnormality notification on the liquid crystal display. As shown in FIG. 10A, the display unit 13 displays a message indicating that the abnormality notification is received on the liquid crystal display according to the instruction. When an instruction is made such that the abnormality notification should be checked through the touch operation (operation of a touch panel provided on the liquid crystal display) performed by the user, the display unit 13 displays the abnormality notification provided by the navigation ECU 11, as shown in FIG. 10B. Thus, the user can check the information regarding the abnormality which has occurred in the vehicle 10 and the countermeasures for the abnormality. In this case, the user name is indicated in the displayed abnormality notification.

The abnormality notification in FIG. 10B can be displayed through the touch operation of the display unit 13 only when the vehicle 10 is stopped. Therefore, when the user performs touch operation of the liquid crystal display while the vehicle 10 is running, a message is displayed, as shown in FIG. 10C, indicating that the abnormality notification shown in FIG. 10B cannot be displayed while the vehicle is running. When the vehicle is running, the user can make an instruction such that the abnormality notification is output by voice using a voice recognition device (not shown). This also enables the user to check the abnormality notification. In this case, when setting is made such that the user name included in the abnormality notification is read, the user name is output by voice. On the other hand, when setting is made such that the user name is not read, the user name is not output by voice.

After step S15 is performed, in step S16, the navigation ECU 11 determines whether the touch operation of a reservation button 13*b* shown in FIG. 10B is performed by the user. In this case, it is obvious that the user cannot make a reservation through the touch operation of the reservation button 13*b* if the vehicle 10 is not stopped. The reservation button 13*b* is used for reserving the date and time when the vehicle 10 is brought to the automobile dealer for servicing. When the touch operation of the reservation button 13*b* is performed, the navigation ECU 11 makes an affirmative determination, afterwhich step S17 is performed.

On the other hand, when the touch operation of the reservation button 13*b* is not performed by the user within a predetermined time (e.g., 30 seconds), the navigation ECU 11 makes a negative determination in step S16. The abnormality information transmission notifying program temporarily ends in step S24.

When the abnormality information transmission notifying program thus ends, the after-mentioned failure information (diagnostic information) is not transmitted to the control center 20 and the automobile dealer. Therefore, by incorporating a command for transmitting the failure information (diagnostic information) into an operation button (e.g., "return" button and "forward" button) provided in an advertisement transmitted arbitrarily by the control center 20, step S20 and the following steps in the after-mentioned abnormality information transmission program can be performed due to the touch operation of the operation button performed by the user.

When the command is incorporated into the operation button and the failure information (diagnostic information) is transmitted, the following conditions need to be satisfied in order to minimize unnecessary communication. The conditions are as follows: (a); the control center 20 transmits the present abnormality notification within, for example, four weeks after the previous abnormality notification was transmitted, and also, received the same alarm lamp illumination information as the present abnormality notification within, for example, two weeks before the present abnormality notification is transmitted, and (b); for example, four or more weeks have elapsed since the control center 20 received the failure information (diagnostic information) related to the alarm lamp illumination information.

The condition (a) is used for identifying the state where the same alarm lamp illumination information is frequently transmitted to the control center 20, and the control center 20 repeatedly transmits the abnormality notification (as mentioned above, the intervals of seven days or more are maintained, though). The condition (b) is used for identifying the state where, although the control center 20 received the failure information (diagnostic information) related to the same alarm lamp illumination information, the failure information (diagnostic information) becomes old due to the lapse of the predetermined time. In this case, due to the condition (b), the vehicle 10 does not transmit the failure information (diagnostic information) to the control center 20 before the predetermined time (four weeks) elapses after the failure information (diagnostic information) is transmitted to the control center 20.

When the above-mentioned conditions (a) and (b) are satisfied, the control device 21 of the control center 20 incorporates the command into an advertisement or the like, and transmits it to the vehicle 10. When the touch operation of the operation button is performed by the user, the navigation ECU 11 and the gateway ECU 15 perform after-mentioned step S20 and the following steps. Thus, even when the touch operation of a reservation button 12*b* is not performed by the user, the control center 20 and the automobile dealer can obtain the failure information (diagnostic information) required for servicing. Even in this case, it is obvious that the touch operation by the user can be performed only when the vehicle is stopped.

In step S17, the navigation ECU 11 provides the communication device 14 with the reservation information indicating that the touch operation of the reservation button 13*b* is performed, and instructs the communication device 14 to transmit the reservation information to the control center 20. The communication device 14 transmits the reservation information to the control center 20 according to the instruction. In the transmission of the reservation information, the communication device 14 transmits the MAC address information thereof along with the reservation information.

In the control center 20, in step C16, the reservation information transmitted in step S17 and the MAC address information are received by the control device 21, and temporarily stored in the RAM. The control device 21 searches for and extracts the MAC address information matching the MAC address information stored in the RAM in all the MAC address information stored in the user information database 24, using the MAC address information temporarily stored in the RAM. The control device 21 then obtains the stored automobile dealer identification information linked to the extracted MAC address information.

Next, the control device 21 searches the automobile dealer information database 26 using the obtained automobile dealer identification information, and obtains the automobile dealer information regarding the automobile dealer identified by the automobile dealer identification information. The control device 21 then checks the business days and business hours of the automobile dealer, and transmits the reservation information to the automobile dealer computer 30.

When it is found, as a result of checking the business days and business hours of the automobile dealer, that the reservation cannot be made, for example, the control device 21 can receive the present location information regarding the vehicle 10 from the navigation ECU 11 of the vehicle 10 and notify the user of an automobile dealer near the present location indicated in the present location information. The control device 21 can search the automobile dealer database 26, and transmit the information regarding the automobile dealer which can be reserved so as to notify the user of the information.

The automobile dealer computer 30 obtains the reservation information transmitted in step C16 and resisters the servicing reservation in step D12, afterwhich step D13 is performed. In step D13, the automobile dealer computer 30 transmits the registration completion notification for the user, indicating that registration of servicing is completed, to the control center 20.

In the control center 20, the control device 21 receives the registration completion notification transmitted from the automobile dealer computer 30 in step D13 and the failure information transmission request in step C17, and step C18 is then performed. In step C18, the control device 21 transmits the received registration completion notification and the failure information transmission request to the vehicle 10. The failure information transmission request is transmitted such that detailed information regarding an abnormality which has occurred in the vehicle 10, that is, the failure information (diagnostic information) is transmitted.

In the vehicle 10, in step S18, the communication device 14 receives the registration completion notification and the failure information transmission request transmitted in step C18, and provides the received information to the navigation ECU 11.

In step S19, the navigation ECU 11 provides the display unit 13 with the registration completion notification provided in step S18. The display unit 13 displays the provided registration completion notification on the liquid crystal display. The user can thus check completion of the servicing reservation of the vehicle 10.

In step S20, the navigation ECU 11 determines whether the vehicle 10 is stopped via the gate way ECU 15, using the various data output from the ECUs 16, 17, 18 and 19 via the gateway ECU 15. The navigation ECU 11 repeatedly performs step S20 until it is determined that the vehicle 10 is stopped. When it is determined that the vehicle 10 is stopped, the navigation ECU II makes an affirmative determination, and step S21 is then performed.

Figure 6:
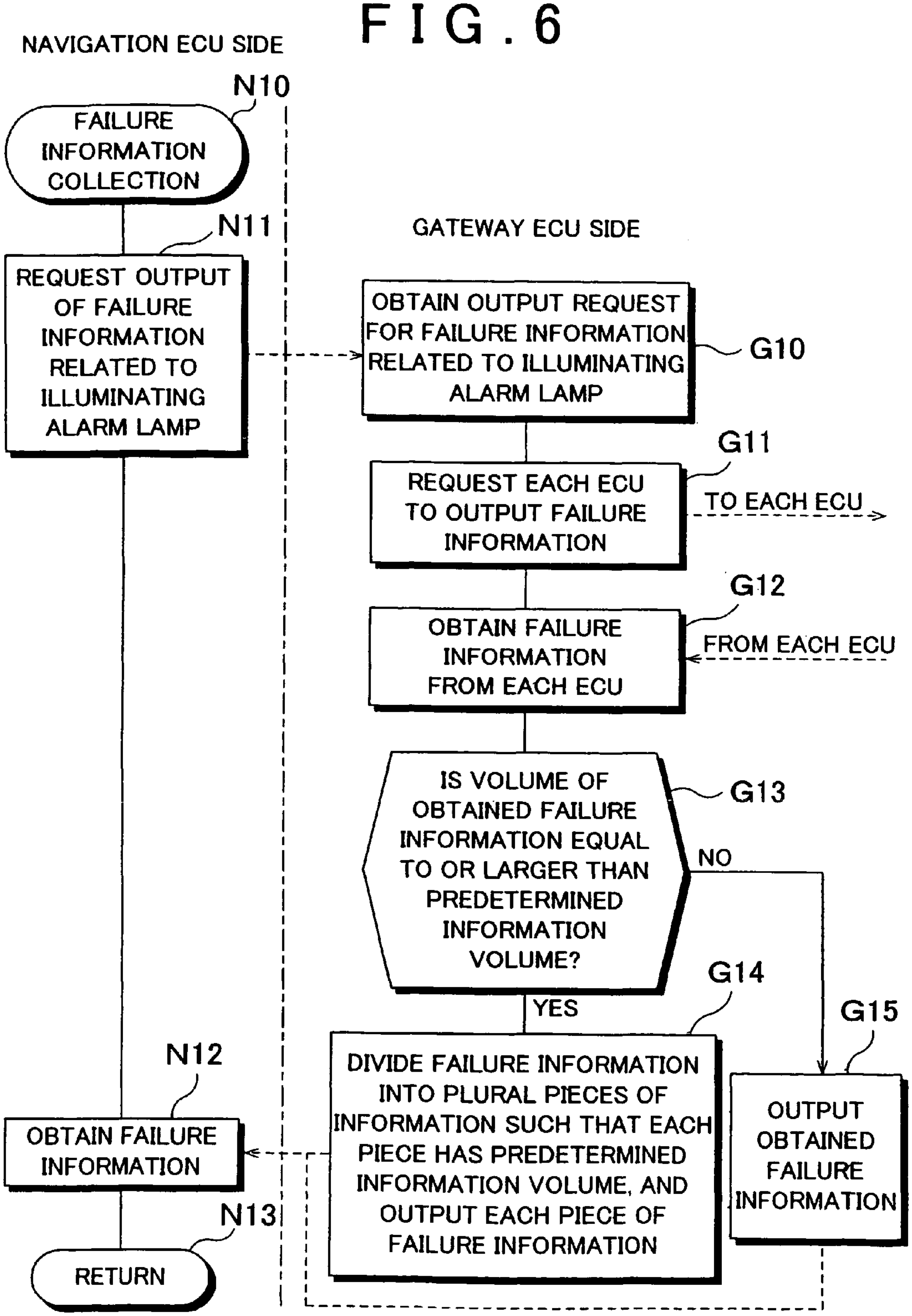
FIG. 6 is a flowchart of a failure information collecting routine performed by a navigation ECU and a gateway ECU mounted in the vehicle shown in FIG. 1.

In step S21, the navigation ECU II and the gateway ECU 15 perform the "failure information collecting routine" shown in FIG. 6 in cooperation with each other. The "failure information collecting routine" is used for collecting the failure information (diagnostic information). The diagnostic information is output from each of the ECUs 16, 17, 18 and 19 mounted in the vehicle 10. Therefore, when the routine is performed while the vehicle is running, loads may be placed on the ECUs 16, 17, 18 and 19. Accordingly, the "failure information collecting routine" is performed while the vehicle 10 is stopped.

The "failure information collecting routine" is started in step N10. In step N11, the navigation ECU 11 requests the gateway ECU 15 to output the failure information related to the alarm lamp illumination information based on the failure information transmission request received in step S18.

In step G10, the gateway ECU 15 obtains the output request provided from the navigation ECU 11 in step N11, and step G11 is then performed. In step G11, the gateway ECU 15 outputs the output request signal to the ECU, in which an abnormality related to the alarm lamp illumination information has occurred, among the ECUs 16, 17, 18 and 19 via the network built in the vehicle such that the diagnostic information is output. The diagnostic information includes detection values obtained by various sensors, the operation state data of devices controlled by the ECUs, and the like. The diagnostic information is stored in the RAM (not shown) of each of the ECUs 16, 17, 18 and 19.

The navigation ECU 11 and the gateway ECU 15 check whether the failure information transmission request transmitted from the control center 20 is accidentally changed to another command through communication in cooperation with each other, in order to prevent unnecessary operation due to the other command. When another command transmitted from the control center 20 is accidentally changed to the failure information transmission request through communication, the gateway ECU 15 does not output the request signal to the ECUs 16, 17, 18 and 19.

In step G12, the gateway ECU 15 obtains the diagnostic information. Among the ECUs 16, 17, 18 and 19, the ECU, in which an abnormality related to the alarm lamp illumination information has occurred, outputs the diagnostic information stored in the RAM thereof to the gateway ECU 15 via the network. The gateway ECU 15 obtains the output diagnostic information, and step G13 is then performed.

In step G13, the gateway ECU 15 determines whether the data volume of the diagnostic information obtained in step G12 is equal to or larger than a predetermined information volume. As mentioned above, the diagnostic information includes the detection values obtained by various sensors and the operation state data. Accordingly, for example, when abnormalities have occurred in two or more devices, the data volume of the diagnostic information to be obtained may be enormous. Due to the flow of the enormous volume of the diagnostic information through the network built in the vehicle 10, the network may be saturated. When the enormous volume of the diagnostic information is transmitted to the control center 20 and the automobile dealer, communication time and communication costs are also increased. Particularly, due to an increase in the communication time, a failure may occur in the communication between another vehicle and the control center 20. In this case, the predetermined information volume is set in consideration of communication time and communication costs. When the determination is made, the gateway ECU 15 buffers the output diagnostic information in the RAM thereof.

When it is determined that the data volume of the diagnostic information is equal to or larger than the predetermined information volume, the gateway ECU 15 makes an affirmative determination, and step G14 is then performed. In step G14, the gateway ECU 15 divides the obtained diagnostic information into plural pieces of the information such that each piece has the predetermined information volume, and outputs each piece of diagnostic information to the navigation ECU 11.

On the other hand, when it is determined that the data volume of the obtained diagnostic information is smaller than the predetermined information volume, the gateway ECU 15 makes a negative determination in step G13, and step G15 is then performed. In step G15, the gateway 15 outputs the obtained diagnostic information to the navigation ECU 11. In step N12, the navigation ECU 11 obtains the diagnostic information output in step G14 or step G15. At this time, the navigation ECU 11 can obtain the diagnostic information from the gateway ECU 15 only for a predetermined time (e.g., approximately 10 seconds). This prevents the diagnostic information having an enormous data volume from flowing through the network built in the vehicle 10. As a result, the network can be effectively prevented from being saturated. In addition, since the data volume of the diagnostic information obtained by the navigation ECU 11 is limited, communication time and communication costs can be reduced when the diagnostic information is transmitted to the control center 20 and the automobile dealer. The navigation ECU 11 then ends the "abnormality information collecting routine" in step N13.

When the vehicle is placed in the automobile dealer for servicing, a failure information obtaining device (diagnostic tool) may be connected to the network built in the vehicle, and the diagnostic information may be collected by the failure information obtaining device. At this time, the output request signal output from the failure information obtaining device to each of the ECUs 16, 17, 18 and 19 is the same as the output request signal output from the gateway signal 15 (or the failure information transmission request transmitted from the control center 20). Therefore, each of the ECUs 16, 17, 18 and 19 outputs the diagnostic information stored in the RAM thereof to the network.

However, the gateway ECU 15 can distinguish between the output request signal output therefrom and the output request signal output from the failure information obtaining device. Therefore, the gateway 15 does not provide the navigation ECU 11 with the diagnostic information output to the network, when the failure information obtaining device is connected to the network. This prevents the diagnostic information from being erroneously transmitted from the vehicle placed in the automobile dealer for servicing to the control center 20 and the automobile dealer, which minimizes unnecessary communication.

Note that prevention of erroneous transmission of the diagnostic information may be performed as below. The gateway ECU 15 prevents erroneous transmission of the diagnostic information output from the ECUs (e.g., the engine ECU 16) connected to the control system network (CAN) among the networks built in the vehicle 10. Meanwhile, the navigation ECU 11 prevents erroneous transmission of the diagnostic information output from the ECUs (e.g., the door ECU 18) connected to the body system network (BEAN) among the networks built in the vehicle 10. Thus, erroneous transmission of the diagnostic information may be prevented by the navigation ECU 11 and the gateway ECU 15.

The process returns to the flowchart in FIG. 4A again. After step S21 is performed, the navigation ECU 11 provides the communication device 14 with the obtained diagnostic information, and the communication device 14 transmits the diagnostic information to the control center 20 in step S22. When the diagnostic information is divided into plural pieces, the navigation ECU 11 provides these pieces of diagnostic information to the communication device 14 one by one, and the communication device 14 transmits these pieces of diagnostic information to the control center 20 one by one in the order of provision. In this transmission, the communication device 14 transmits the vehicle ID information along with the diagnostic information.

In the case where the failure information obtaining device is connected to the network, when a failure has occurred in the gateway ECU 15 and an enormous volume of diagnostic information is transmitted to the control center 20, the control center 20 does not receive this diagnostic information. Namely, the control center 20 can determine whether the diagnostic information is the diagnostic information transmitted according to the failure information transmission request transmitted therefrom. When the diagnostic information is transmitted due to a failure in the gateway ECU 15, the control center 20 separately transmits a command for canceling the transmission of the diagnostic information to the navigation ECU 11. This prevents unnecessary communication between the vehicle 10 and the control center 20.

In the control center 20, in step C19, the control device 21 receives the failure information (diagnostic information) transmitted in step S22. The control device 21 then transmits the failure information (diagnostic information) to the automobile dealer computer 30 which has transmitted the registration completion notification, in step C20.

Figure 4C:
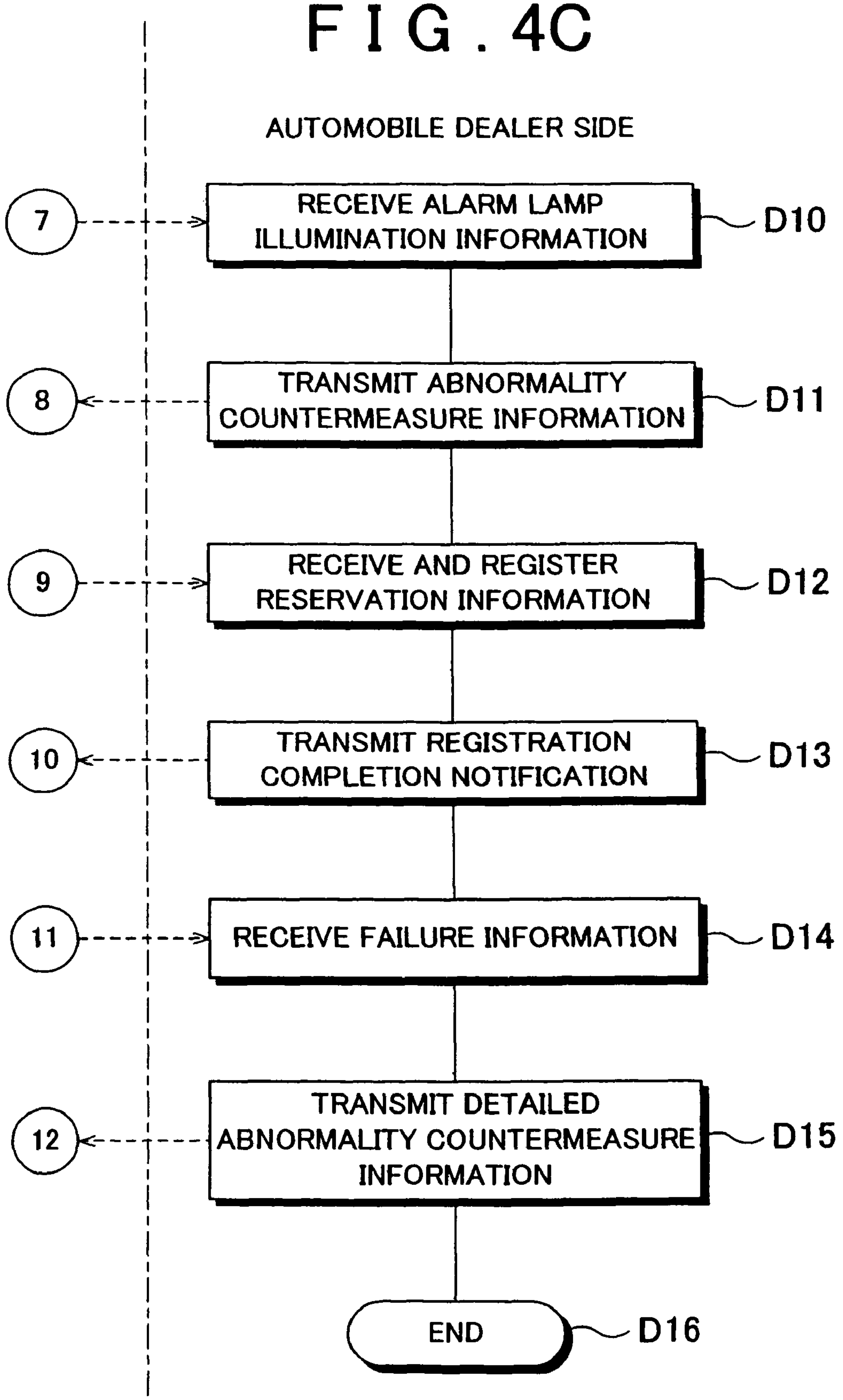

As shown in FIG. 4C, in step D14, the automobile dealer computer 30 receives the failure information (diagnostic information) transmitted in step C20, and step D15 is then performed. In step D15, the abnormality countermeasure information, which is more detailed than the abnormality countermeasure information transmitted in step D11 is transmitted based on the received failure information (diagnostic information). The person(s) responsible can accurately ascertain the abnormality which has occurred in the vehicle 10 by analyzing the received failure information (diagnostic information) in detail.

Accordingly, the person(s) responsible can deal with the cause of the failure which has occurred in the vehicle 10 individually, compared with the case where the alarm lamp illumination information is obtained. Therefore, the person(s) responsible prepares detailed countermeasures for the time until the vehicle 10 is placed in the automobile dealer for servicing. Examples of the countermeasures are "the engine coolant temperature is high. Please stop the vehicle at a safe place, and wait there until a carrier vehicle arrives" and "the abnormality does not cause a problem in running. Please keep driving and bring the vehicle in the automobile dealer you have reserved". The automobile dealer computer 30 then transmits the detailed abnormality countermeasure information indicating the detailed abnormality countermeasures prepared by the person(s) responsible to the control center 20. Then, the "abnormality information transmission notifying program" ends in step D16.

In the control center 20, in step C21, the control device 21 receives the detailed abnormality countermeasure information transmitted in step D15. The control device 21 then searches the user information database 24 and obtains the mail address information of the user, using the vehicle ID information received in step C19. The control device 21 transmits the received detail abnormality countermeasure information using the obtained mail address information. The control device 21 then ends the "abnormality information transmission notifying program" in step C22.

In the vehicle 10, in step S23, the communication device 14 receives the detailed abnormality countermeasure information transmitted in step C21, and provides the information to the navigation ECU 11. The navigation ECU 11 obtains the detailed abnormality countermeasure information. The navigation ECU 11 then provides the detailed abnormality countermeasure information to the display unit 13. The display unit 13 notifies the user of the detailed abnormality countermeasure information by displaying the information on the liquid crystal display or by voice, in the same manner as the notification in step S15. When the detailed abnormality countermeasure information is thus notified to the user, the navigation ECU 11 ends the "abnormality information transmission notifying program" in step S24.

In the above-mentioned vehicular diagnostic system, through the communication between the vehicle 10 and the control center 20, the vehicle 10 transmits the alarm lamp illumination information and the failure information (diagnostic information) indicating an abnormality which has occurred in the vehicle 10 to the control center 20, and the control center 20 transmits the abnormality notification based on the abnormality countermeasure information from the automobile dealer, to the vehicle 10. Accordingly, it is necessary to make a diagnosis of whether the communication between the vehicle 10 and the control center 20 is performed appropriately at predetermined intervals. The diagnosis of the communication will be described below in detail.

Figure 7:
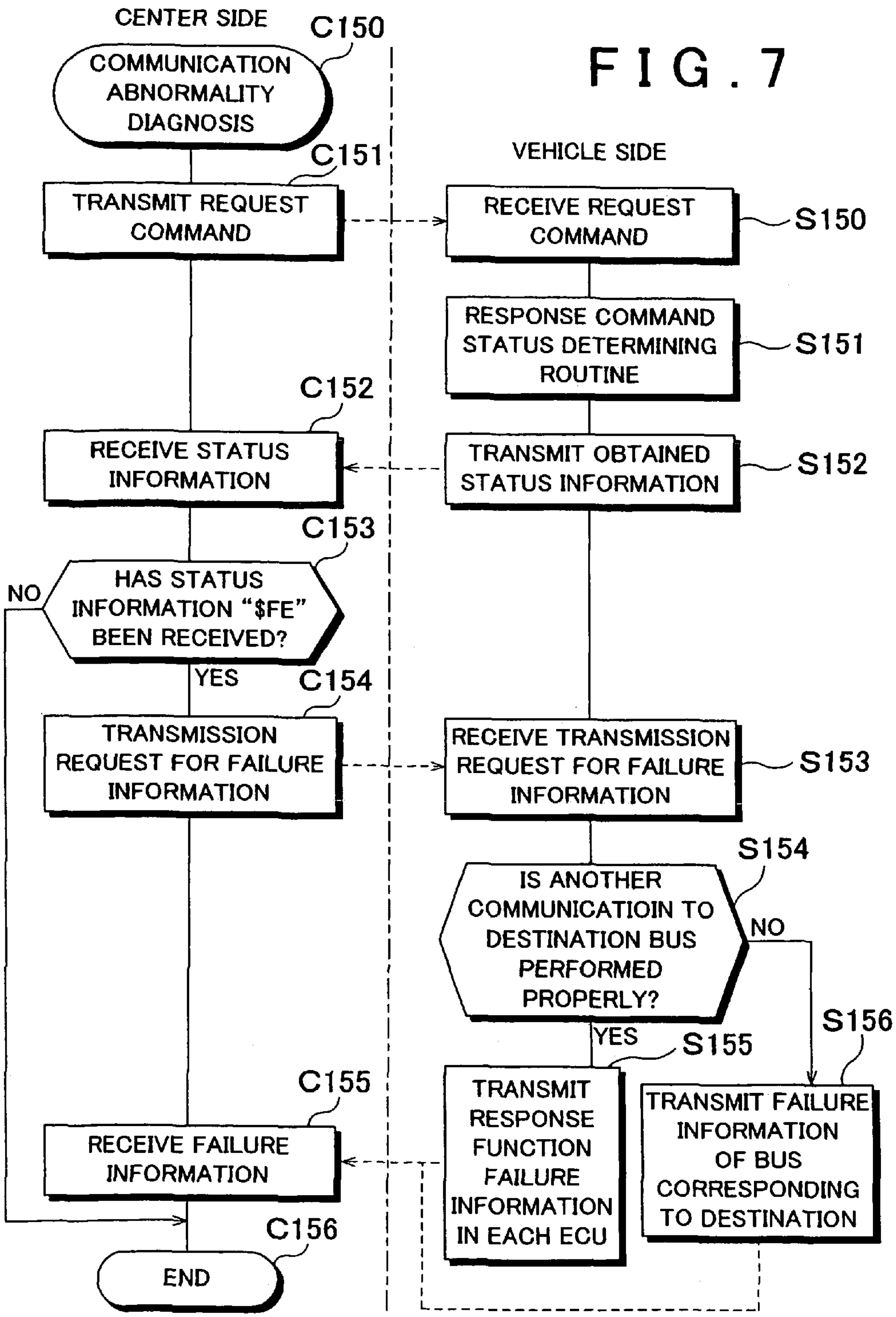
FIG. 7 is a flowchart of a communication abnormality diagnostic program performed by the vehicle and the control center shown in FIG. 1.

The diagnosis of the communication is made by performing the "communication abnormality diagnostic program" shown in FIG. 7 at predetermined intervals. The "communication abnormality diagnostic program" is started in step C150. In step C151, the control device 21 of the control center 20 transmits a predetermined command for diagnosing the communication state (hereinafter, referred to as a "request command") to the vehicle 10.

In the vehicle 10, in step S150, the communication device 14 receives the request command transmitted in step C151, and provides the received request command to the navigation ECU 11. The navigation ECU 11 obtains the provided request command, and provides the obtained request command to the gateway ECU 15. The navigation ECU 11 and the gateway ECU 15, to which the request command is provided, perform a "response command status determining routine" in step S151 in cooperation with each other.

Figure 8:
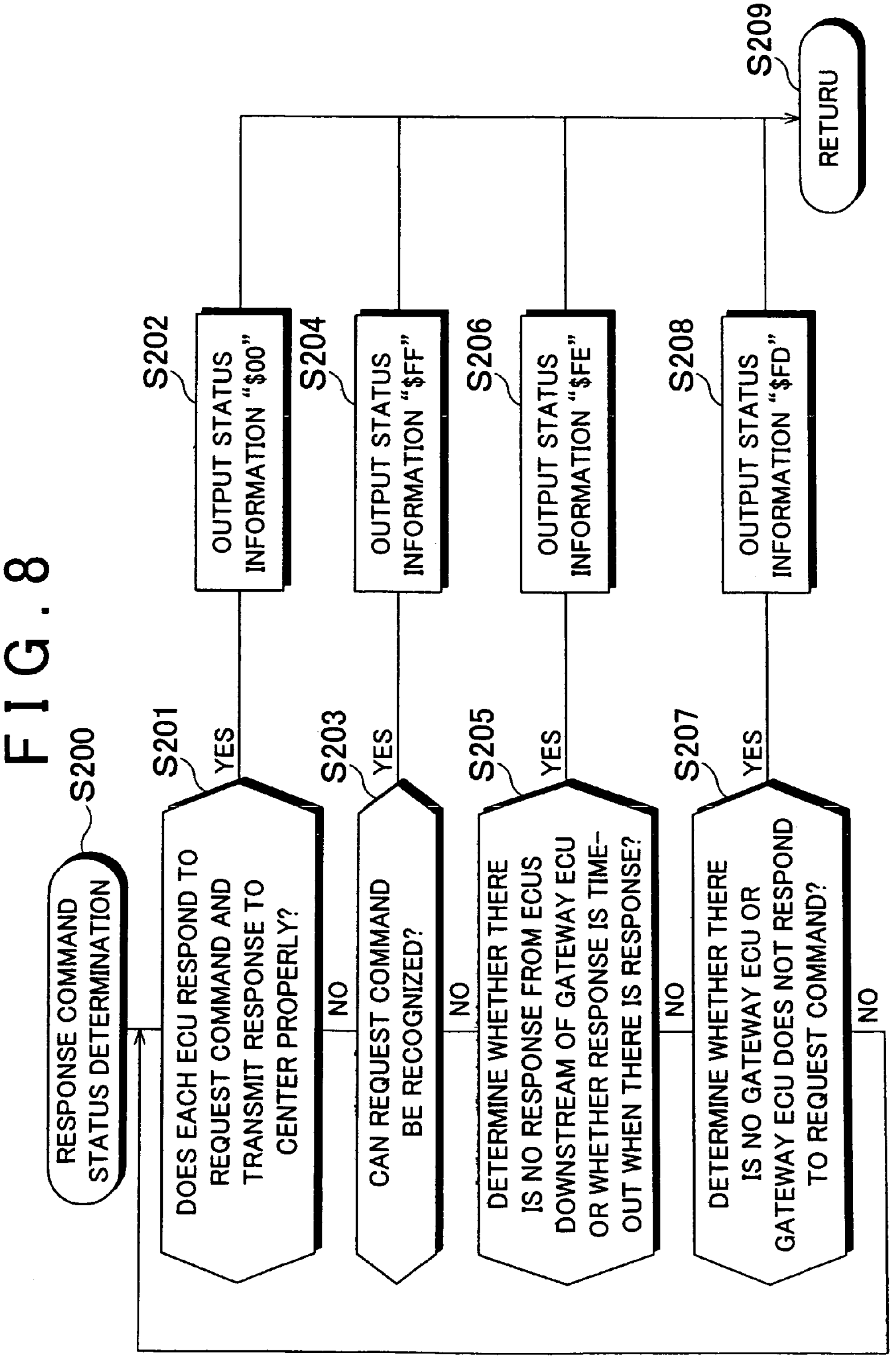
FIG. 8 is a flowchart of a response command status determining routine performed by the vehicle shown in FIG. 1.

As shown in FIG. 8, the "response command status determining routine" is started in step S200. In step S201, the navigation ECU 11 and the gateway ECU 15 determine whether each of the ECUs 16, 17, 18 and 19 responds to the request command properly, and transmits a response to the control center 20 properly. When it is determined that each of the devices and ECUs mounted in the vehicle 10 responds to the request command properly, and transmits a response to the request command properly, both the navigation ECU 11 and the gateway ECU 15 make an affirmative determination, and step S202 is then performed.

In step S202, the navigation ECU 11 and the gateway ECU 15 store the status information "$00", which indicates that each of the devices and ECUs responds to the request command properly, that is, an abnormality has not occurred, in the RAM of the navigation ECU 11. In step S209, the "response command status determining routine" ends. On the other hand, when it is determined that an abnormality has occurred in at least one of the devices or at least one of the ECUs, and the device or the ECU does not respond to the request command properly, both the navigation ECU 11 and the gateway ECU 15 make a negative determination, and step S203 is then performed.

In step S203, the navigation ECU 11 determines whether the command can be recognized. When the request command itself transmitted from the control center 20 is the information which cannot be recognized by the navigation ECU 11 (undefined information), the navigation ECU 11 makes an affirmative determination, and step S204 is then performed. In step S204, the navigation ECU 11 stores the status information "$FF", which indicates that the request command is the information which cannot be recognized, in the RAM. In step S209, the "response command status determining routine" ends. On the other hand, when the request command is the information which can be recognized by the navigation ECU 11, the navigation ECU 11 makes an affirmative determination, and step S205 is then performed.

In step S205, the gateway ECU 15 provides the request command to each of the ECUs 16, 17, 18 and 19, and determines whether each of the ECUs does not make a response, and whether the response is time-out when there is a response. When it is determined that there is no response from the ECUs 16, 17, 18 and 19, or the response is time-out, the gateway ECU 15 makes an affirmative determination, and step S206 is then performed. In step S206, the gateway ECU 15 outputs the status information "$FE", which indicates that an abnormality has occurred in at least one of the ECUs 16, 17, 18 and 19, to the navigation ECU 11. In step S209, the "response command status determining routine" ends. On the other hand, when there is a response from the ECUs 16, 17, 18 and 19, and the response is not time-out, the gateway ECU 15 makes a negative determination, and step S207 is then performed.

In step S207, the navigation ECU 11 determines whether the gateway ECU 15 responds to the request command. When there is no gateway ECU 15 or when the gateway ECU 15 is not connected to the network built in the vehicle 10 and therefore the gateway ECU 15 does not respond to the request command, the navigation ECU 11 makes an affirmative determination, and step S208 is then performed. In step S208, the navigation ECU 11 stores the status information "$FD", which indicates that there is no gateway ECU 15 or that the gateway ECU 15 is not connected to the network, in the RAM. In step S209, the "response command status determining routine" ends. On the other hand, when there is the gateway ECU 15 and the gateway ECU 15 is connected to the network, the navigation ECU 11 makes an affirmative determination. In this case, since the status information is not output, the navigation ECU 11 and the gateway ECU 15 perform step S201 and the following steps again, and repeatedly perform these steps until the status information is output.

The process returns to the flowchart in FIG. 7. After step S151 is performed, in step S152, the navigation ECU 11 provides the obtained status information to the communication device 14, and instructs the communication device 14 to transmit the status information to the control center 20. The communication device 14 transmits the status information to the control center 20 according to the instruction.

In the control center 20, in step C152, the control device 21 receives the status information transmitted in step S152, and temporarily stores the status information in the RAM. Step C153 is then performed. By receiving the status information from the vehicle 10, the control device 21 of the control center 20 can ascertain where in the vehicle 10 the abnormality has occurred, in addition to whether an abnormality has occurred in the communication.

In step C153, the control device 21 determines whether the status information "$FE", that is, the status information indicating that an abnormality has occurred in at least one of the ECUs 16, 17, 18 and 19, has been received. When the status information has not been received, the control device 21 makes a negative determination, and the "communication abnormality diagnostic program" ends in step C156. On the other hand, when the status information "$FE" has been received, the control device 21 makes an affirmative determination, and step C154 is then performed.

In step C154, the control device 21 requests the vehicle 10 to transmit the failure information in order to check in which of the ECU among the ECUs 16, 17, 18 and 19 an abnormality has occurred, or whether an abnormality has occurred in a connection path connecting the ECUs to each other (hereinafter, this connection path will be referred to as a "destination bus"). When transmission of the failure information is requested, the destination information of each of the ECUs 16, 17, 18 and 19 is attached and transmitted.

In the vehicle 10, in step S153, the communication device 14 receives the transmission request for the failure information transmitted in step C154, and provides the transmission request to the navigation ECU 11. The navigation ECU 11 obtains the transmission request for the provided failure information, and provides the transmission request to the gateway ECU 15.

In step S154, the gateway ECU 15 outputs the output request for the failure information to each of the ECUs 16, 17, 18 and 19 using the destination information attached to the transmission request for the failure information obtained in step S153. At least when there is a response from the ECUs 16, 17, 18 and 19 to the output request, another communication to the destination bus is performed properly. Therefore, the gateway ECU 15 makes an affirmative determination, and step S155 is then performed. In step S155, the gateway ECU 15 outputs the failure information, which indicates that an abnormality has occurred in the response function of at least one of the ECUs 16, 17, 18 and 19, to the navigation ECU 11. The navigation ECU 11 obtains the output failure information, and provides the failure information to the communication device 14. The communication device 14 transmits the provided failure information to the control center 20.

On the other hand, in step S154, when there is no response from the ECUs 16, 17, 18 and 19, an abnormality has occurred in the destination bus. Therefore, the gateway ECU 15 makes a negative determination, and step S156 is then performed. In step S156, the gateway ECU 15 outputs the failure information indicating that an abnormality has occurred in the destination bus to the navigation ECU 11. The navigation ECU 11 obtains the output failure information, and provides the failure information to the communication device 14. The communication device 14 transmits the provided failure information to the control center 20.

In the control center 20, in step C155, the control device 21 receives the failure information transmitted in step S155 or S156. Thus, the control device 21 can determine in which of the ECU among the ECUs 16, 17, 18 and 19 an abnormality has occurred, or whether an abnormality has occurred in the destination bus connecting the ECUs to each other. Then, the "communication abnormality diagnostic program" ends in step S156.

In the above-mentioned vehicular diagnostic system, the user can check the alarm lamp illumination information and the abnormality notification transmitted from the control center 20 by the display indicated on the display unit 13 mounted in the vehicle 10 or by voice. In addition, the alarm lamp illumination information and the abnormality notification can be checked by using the personal computer 40 or the portable information terminal device 50 which can be used by the user.

The user operates the personal computer 40 or the portable information terminal device 50, and accesses the control center 20 via the network 60. More particularly, the user inputs the URL (Uniform Resource Locator) of the control center 20 which is notified in advance, the user ID information, and the user password, through the use of the input device of the personal computer 40 or the portable information terminal device 50.

Thus, the personal computer 40 or the portable information terminal device 50 accesses the control center 20 based on the input URL. When the personal computer 40 or the portable information terminal device 50 accesses the control center 20, the control device 21 of the control center 20 authenticates the user based on the transmitted user ID information and the user password. The control device 21 authenticates the user by comparing the user identification information stored in the database 24 in advance with the transmitted user ID information and the user password, using the user information database 24. When authenticating the user, the control device 21 transmits the initial screen information to the personal computer 40 or the portable information terminal device 50. When transmitting the initial screen information, the control device 21 incorporates the vehicle ID information (e.g., registration number) stored in the user information database 24 in advance into the initial screen information, and transmits this initial screen information.

Figure 11:
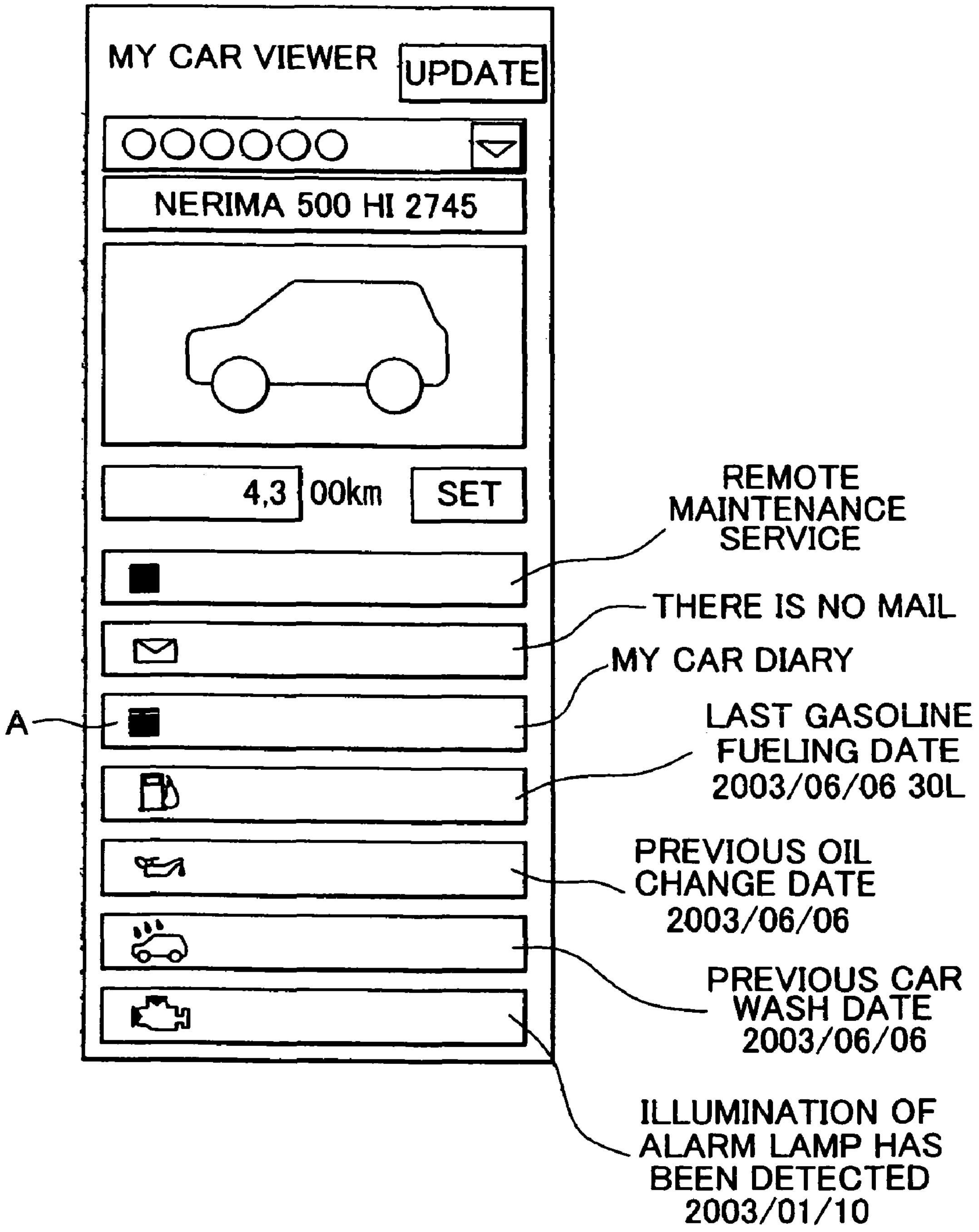
FIG. 11 is a view for describing an initial screen when a user accesses the control center through the use of a portable information terminal device or a personal computer.

When the initial screen information is transmitted from the control center 20, the initial screen is displayed on the display unit of the personal computer 40 or the portable information terminal device 50, as shown in FIG. 11. On the initial screen, when the user clicks the "my car diary" button "M", this selection information is transmitted to the control center 20. When receiving the selection information, the control device 21 of the control center 20 extracts the history information which is stored in relation with the vehicle ID information that matches the above vehicle ID information in all the history information stored in the history information database 27, using the vehicle ID information. The control device 21 transmits the my car diary screen information, which is automatically prepared by incorporating the extracted history information into the predetermined format, to the personal computer 40 or the portable information terminal device 50.

Figure 12:
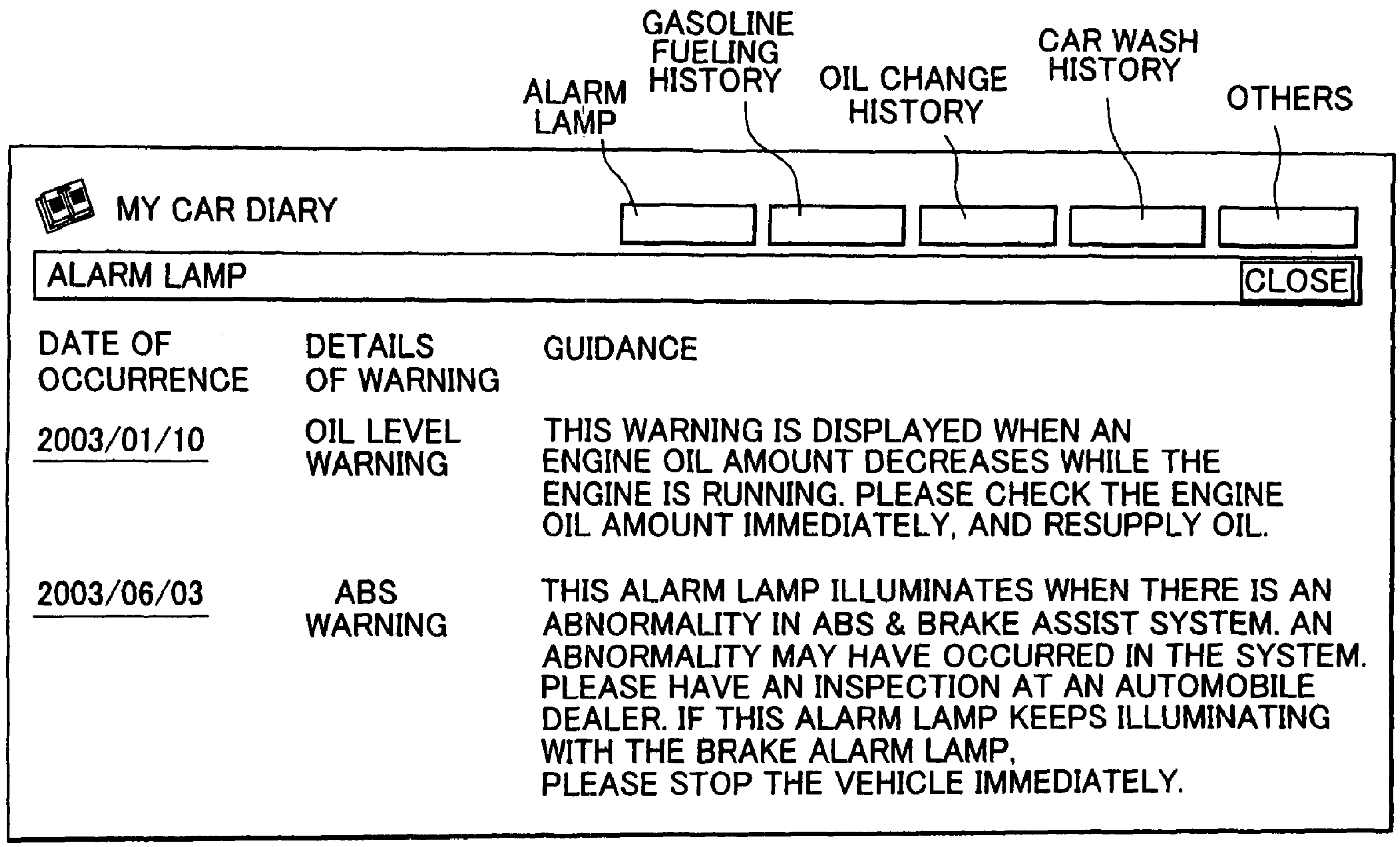
FIG. 12 is a view indicating a screen showing an alarm lamp illumination history when the user accesses the control center through the use of the portable information terminal device or the personal computer.
Figure 13:
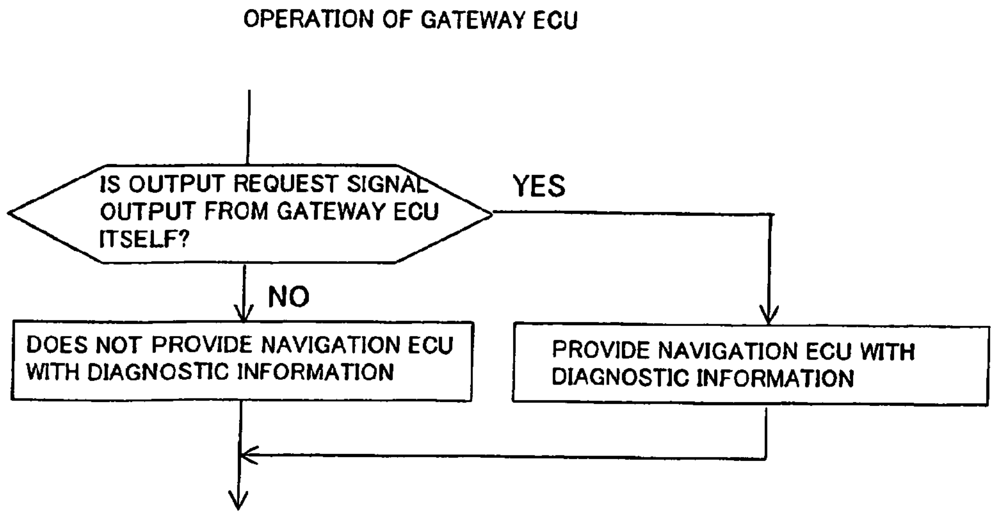
FIG. 13 is a flowchart depicting operation of the Gateway ECU.
Figure 14:
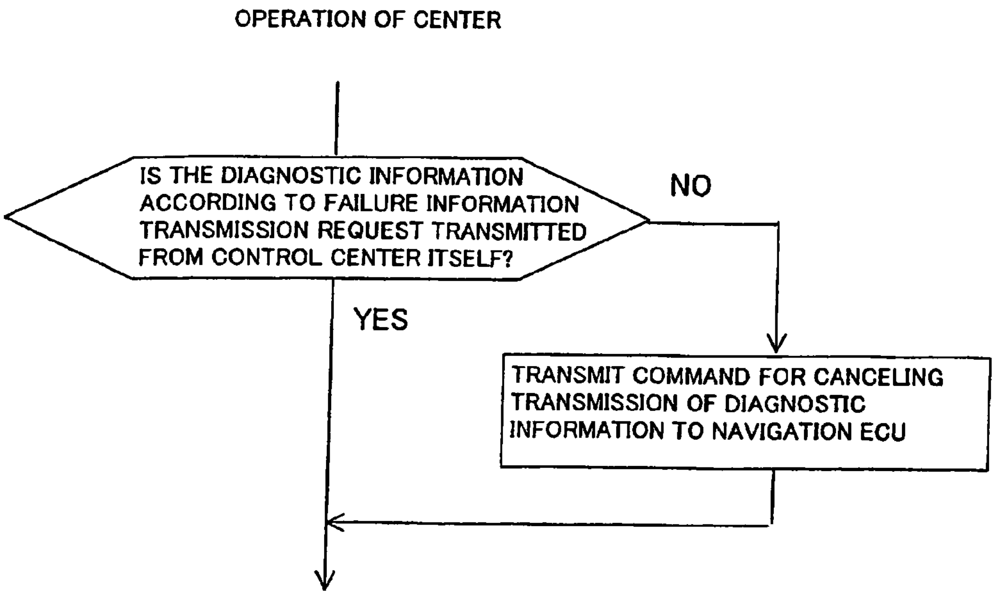
FIG. 14 is a flowchart depicting operation of the Control Center.

When receiving the my car diary screen information transmitted from the control center 20, the personal computer 40 or the portable information terminal device 50 changes the display screen from the initial screen, and displays the my car diary screen, as shown in FIG. 12. Thus, the user can check the date when an abnormality occurred in the vehicle 10, the cause of the alarm lamp illumination and the guidance, using the personal computer 40 or the portable information terminal device 50.

Also, the user can obtain the automobile dealer information by accessing the control center 20 using the personal computer 40 or the portable information terminal device 50. The user can access the automobile dealer information database 26 by accessing the control center 20 using the personal computer 40 or the portable information terminal device 50. This offers convenience to the user, since the user can obtain the automobile dealer information, that is, the business days and business hours when necessary.

Since the user obtains the automobile dealer information according to the operation by the user, leaking of the private information can be prevented. For example, when the automobile dealer information is unilaterally transmitted from the automobile dealer to the user, the automobile dealer needs to obtain the user private information such as an e-mail address or a phone number in advance. However, since the user and the automobile dealer communicate with each other via the control center 20, the automobile dealer need not obtain the private information. Therefore, the private information need not be unnecessarily shared with the automobile dealer. As a result, the private information can be reliably protected.

As can be understood from the above description, according to the embodiment, since the vehicle 10 transmits the alarm lamp illumination information to the control center 20, a load is prevented from being placed on the communication line. Therefore, the control center 20 can ascertain whether an abnormality has occurred in the vehicle 10 in real time, which enables prompt provision of countermeasures to the user. The vehicle 10 collects and transmits the failure information (diagnostic information) related to the abnormality, after transmitting the alarm lamp illumination information. The control center 20 can thus check the abnormality in more detail, which enables provision of more appropriate countermeasures to the user.

The control center 20 transmits the abnormality notification for occurrence of an abnormality based on the alarm lamp illumination information. Therefore, the user can easily take appropriate countermeasures for the abnormality. Also, the control center 20 transmits the detailed abnormality countermeasure information for the abnormality based on the failure information (diagnostic information). Therefore, the user can take appropriate countermeasures for the abnormality.

Since the abnormality countermeasure information and the detailed abnormality countermeasure information are prepared by the person(s) responsible at the automobile dealer, expert opinions regarding the abnormality can be included. Therefore, the user can take more appropriate countermeasures for the abnormality. Since the person(s) responsible can analyze the abnormality, appropriate countermeasures can be taken for each cause of the abnormality individually. Therefore, the user can take more appropriate countermeasures. By transmitting the failure information, that is, the diagnostic information from the vehicle 10, the automobile dealer can ascertain the abnormality accurately. Therefore, appropriate countermeasures can be provided to the user.

The control center 20 can obtain the failure information (diagnostic information) from the vehicle 10 when necessary. The control center 20 can transmit the obtained failure information (diagnostic information) to the automobile dealer computer 30. Therefore, the control center 20 can transmit the detailed abnormality countermeasure information prepared at the automobile dealer to the user at appropriate timing.

Also, the vehicle 10 collects the failure information (diagnostic information) when being stopped. This prevents an increase in a load placed on the ECUs 16, 17, 18 and 19 which control the devices related to functions necessary for running of the vehicle 10, that is, "run, stop, and turn". Therefore, the user can drive the vehicle suitably.

Also, collection of the failure information (diagnostic information) can be started when the user operates the reservation button 12*b* incorporated in the abnormality notification. Therefore, an intention of the user can be directly or indirectly reflected on the determination whether the failure information (diagnostic information) is to be transmitted.

Also, the alarm lamp illumination history can be checked by using the personal computer 40 or the portable information terminal device 50. Thus, the user can check an abnormality which has occurred in the vehicle 10, for example, by using a cellular phone, even when the user is not in the vehicle 10. Also, a person other than the user can check an abnormality which has occurred in the vehicle using a cellular phone or the like. Thus, for example, when the alarm lamp 17*a* of the vehicle 10 turns off immediately after illuminating and the user has not recognized occurrence of an abnormality, a person other than the user can notify the user of occurrence of the abnormality.

In the above embodiment, the control center 20 transmits the abnormality notification to the vehicle 10 based on the abnormality countermeasure information transmitted from the automobile dealer computer 30 via the communication between the control center 20 and the automobile dealer computer 30 in the automobile dealer. Instead of this, the abnormality countermeasure information may be prepared at the control center 20 and then the abnormality notification may be transmitted. In this case, the abnormality countermeasure information is stored in the control center 20 in advance, and the control device 21 of the control center 20 appropriately select the stored abnormality countermeasure information based on the alarm lamp illumination information and the failure information (diagnostic information). The control device 21 then prepares the abnormality notification using the selected abnormality countermeasure information, and transmits the abnormality notification to the vehicle. In this method, the same effects as those in the above embodiment can be obtained.

What is claimed is:

1. A vehicle information-communication system in which a vehicle and a control center are adapted to communicate with each other, and first information and second information regarding a failure in an in-vehicle unit mounted in the vehicle is exchanged, wherein:

the vehicle includes:

an in-vehicle communication network built in the vehicle;

an in-vehicle unit connected to the in-vehicle communication network;

a communication device which is connected to the in-vehicle communication network so as to receive the second information for requesting transmission of the first information regarding the failure in the in-vehicle unit, the second information being transmitted from the control center, and so as to transmit the first information to the control center;

a connection device which is connected to the in-vehicle communication network, and which is connected to a failure diagnostic device, which is provided in an automobile dealer selling vehicles and performing servicing, that obtains the first information and that diagnoses the failure;

a connection determining device which determines whether the failure diagnostic device is connected to the connection device; and a prohibiting device which prohibits the communication device from transmitting the first information to the control center, when the connection determining device determines that the failure diagnostic device is connected to the connection device; and the control center includes:

a transmission requesting device which transmits the second information to the vehicle;

a determining device which determines whether the first information coincides with the second information when the failure diagnostic device is connected to the vehicle in the automobile dealer; and a reception prohibiting device which prohibits reception of the first information by transmitting a command for canceling the transmission of the first information to the vehicle when the determining device determines that the first information does not coincide with the second information.

2. A control center which is adapted to communicate with a vehicle so as to receive first information regarding a failure in an in-vehicle unit, the first information being transmitted from the vehicle, comprising:

a transmission requesting device which transmits second information, that is used for requesting the vehicle to transmit the first information, to the vehicle;

a determining device which determines whether the first information coincides with the second information when a failure diagnostic device which obtains the first information and which diagnoses the failure is connected to the vehicle in an automobile dealer selling vehicles and performing servicing: and a reception prohibiting device which prohibits reception of the first information by transmitting a command for canceling the transmission of the first information to the vehicle when the determining device determines that the first information does not coincide with the second information.

3. A vehicle information-communication system comprising:

the control center of claim 2; and the vehicle;

wherein the control center and the vehicle are adapted to communicate with each other, and the first information and the second information are exchanged; and wherein the vehicle includes:

an in-vehicle communication network built in the vehicle;

the in-vehicle unit connected to the in-vehicle communication network;

a communication device which is connected to the in-vehicle communication network so as to receive the second information for requesting the first information regarding the failure of the in-vehicle unit, and so as to transmit the first information to the control center;

a connection device which is connected to the in-vehicle communication network, and which is connected to the failure diagnostic device;

a connection determining device, which determines whether the failure diagnostic device is connected to the connection device; and a prohibiting device which prohibits the communication device from transmitting the first information to the control center, when the connection determining device determines that the failure diagnostic device is connected to the connection device.

4. A vehicle information-communication method in which a vehicle and a control center are adapted to communicate with each other, the control center transmitting second information, which is used for requesting transmission of first information regarding a failure in an in-vehicle unit mounted in the vehicle, to the vehicle, and obtains the first information, the method comprising:

in the control center:

determining whether the first information coincides with the second information when a failure diagnostic device which obtains the first information and which diagnoses the failure is connected to the vehicle in an automobile dealer selling vehicles and performing servicing; and prohibiting reception of the first information by transmitting a command for canceling the transmission of the first information to the vehicle when it is determined that the first information does not coincide with the second information.

* * * * *